United States Patent
Oleson et al.

(10) Patent No.: US 11,598,343 B2
(45) Date of Patent: Mar. 7, 2023

(54) CEILING FAN SYSTEM WITH BRUSHLESS MOTOR

(71) Applicant: DELTA T, LLC, Lexington, KY (US)

(72) Inventors: Richard A. Oleson, Lexington, KY (US); J. Carey Smith, Lexington, KY (US); Mark A. Toy, Lexington, KY (US); Elios Klemo, Wilmington, NC (US)

(73) Assignee: DELTA T, LLC, Lexington, KY (US)

( * ) Notice: Subject to any disclaimer, the term of this patent is extended or adjusted under 35 U.S.C. 154(b) by 1689 days.

(21) Appl. No.: 15/284,127

(22) Filed: Oct. 3, 2016

(65) Prior Publication Data

US 2017/0089346 A1 Mar. 30, 2017

Related U.S. Application Data

(60) Division of application No. 13/942,164, filed on Jul. 15, 2013, now Pat. No. 9,458,859, which is a division
(Continued)

(51) Int. Cl.
*F04D 25/08* (2006.01)
*F04D 29/64* (2006.01)
(Continued)

(52) U.S. Cl.
CPC ......... *F04D 25/088* (2013.01); *F04D 25/068* (2013.01); *F04D 27/004* (2013.01);
(Continued)

(58) Field of Classification Search
None
See application file for complete search history.

(56) References Cited

U.S. PATENT DOCUMENTS 5,528,229 A * 6/1996 Mehta .................. F04D 25/088
340/3.4
6,967,565 B2 * 11/2005 Lingemann ............ G05B 15/02
340/12.23
(Continued)

OTHER PUBLICATIONS

TI—Users Guide SLAU195A—Dec. 2006—Revised Feb. 2009.*

*Primary Examiner* — Juan G Flores
(74) *Attorney, Agent, or Firm* — Dickinson Wright PLLC; Andrew D. Dorisio

(57) ABSTRACT

A fan system includes a motor, a rotatable hub, and a plurality of fan blades. The motor is coupled with the hub by a hollow drive shaft, such that the drive system of the fan system is gearless. The motor is controlled by a PFC-based control module, which is in communication with sensors that are configured to sense parameters associated with operation of the fan system. The control module is configured to react in certain ways to certain conditions detected by the sensors, such that the fan system uses feedback-based control algorithms. A remote control panel is in communication with the control module. The remote control panel is operable to display fault conditions detected by the sensors. Blade retainers prevent fan blades from falling when a fan blade breaks free from the hub. Pins prevent the hub from falling when the hub breaks free from the rotor.

29 Claims, 18 Drawing Sheets

Related U.S. Application Data of application No. 12/399,428, filed on Mar. 6, 2009, now Pat. No. 8,672,649, which is a continuation-in-part of application No. 12/249,086, filed on Oct. 10, 2008, now Pat. No. 8,147,182.

(60) Provisional application No. 61/034,254, filed on Mar. 6, 2008, provisional application No. 60/978,860, filed on Oct. 10, 2007.

(51) Int. Cl.
| | |
|---|---|
| *F04D 27/00* | (2006.01) |
| *F04D 29/34* | (2006.01) |
| *F04D 29/38* | (2006.01) |
| *F04D 29/60* | (2006.01) |
| *F24F 11/77* | (2018.01) |
| *F04D 25/06* | (2006.01) |
| *F04D 29/32* | (2006.01) |
| *F04D 29/58* | (2006.01) |
| *F24F 11/52* | (2018.01) |

(52) U.S. Cl.
CPC ......... *F04D 27/008* (2013.01); *F04D 29/329* (2013.01); *F04D 29/34* (2013.01); *F04D 29/384* (2013.01); *F04D 29/5806* (2013.01); *F04D 29/601* (2013.01); *F04D 29/646* (2013.01); *F24F 11/77* (2018.01); *F24F 11/52* (2018.01)

(56) References Cited

U.S. PATENT DOCUMENTS

| | | | |
|---|---|---|---|
| 7,455,240 B2* | 11/2008 | Chapman, Jr. | F23N 5/022 236/91 D |
| 8,066,480 B2* | 11/2011 | Madsen | F04D 25/088 416/38 |
| 2003/0156053 A1* | 8/2003 | Wall | G08C 19/28 341/176 |

* cited by examiner

CEILING FAN SYSTEM WITH BRUSHLESS MOTOR

PRIORITY

This application claims priority from the disclosure of U.S. Provisional Patent Application Ser. No. 61/034,254, entitled "Ceiling Fan System with Brushless Motor," filed Mar. 6, 2008, the disclosure of which is incorporated by reference herein in its entirety. This application is also a continuation-in-part of U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein in its entirety, and which claims priority to U.S. Provisional Patent Application Ser. No. 60/978,860, entitled "Ceiling Fan with Concentric Stationary Tube and/or Safety Features," filed Oct. 10, 2007, the disclosure of which is incorporated by reference herein in its entirety.

BACKGROUND

A variety of fan systems have been made and used over the years in a variety of contexts. For instance, various ceiling fans are disclosed in U.S. Pat. No. 7,284,960, entitled "Fan Blades," issued Oct. 23, 2007; U.S. Pat. No. 6,244,821, entitled "Low Speed Cooling Fan," issued Jun. 12, 2001; and U.S. Pat. No. 6,939,108, entitled "Cooling Fan with Reinforced Blade," issued Sep. 6, 2005. The disclosures of each of those U.S. patents are incorporated by reference herein. Another exemplary fan is disclosed in U.S. Pub. No. 2008/0008596, entitled "Fan Blades," published Jan. 10, 2008, the disclosure of which is also incorporated by reference herein. Alternatively, any other suitable fans may be used in conjunction with embodiments described herein.

The outer tip of a fan blade or airfoil may be finished by the addition of an aerodynamic tip or winglet. Merely exemplary winglets are described in U.S. Pat. No. 7,252,478, entitled "Fan Blade Modifications," issued Aug. 7, 2007, the disclosure of which is incorporated by reference herein. Additional winglets are described in U.S. Pub. No. 2008/0014090, entitled "Cuffed Fan Blade Modifications," published Jan. 17, 2008, filed Sep. 25, 2007, the disclosure of which is incorporated by reference herein. Still other exemplary winglets are described in U.S. Design Pat. No. D587,799, entitled "Winglet for a Fan Blade," issued Mar. 3, 2009, the disclosure of which is incorporated by reference herein. In other variations, an angled extension may be added to a fan blade or airfoil, such as the angled airfoil extensions described in U.S. Pub. No. 2008/0213097, entitled "Angled Airfoil Extension for Fan Blade," published Sep. 4, 2008, the disclosure of which is incorporated by reference herein. Other suitable structures that may be associated with an outer tip of an airfoil or fan blade will be apparent to those of ordinary skill in the art. Alternatively, the outer tip of an airfoil or fan blade may be simply closed, or may lack any similar structure at all.

The interface of a fan blade and a fan hub may also be provided in a variety of ways. For instance, an interface component is described in U.S. Non-Provisional patent application Ser. No. 12/233,783, entitled "Aerodynamic Interface Component for Fan Blade," filed Sep. 19, 2008, the disclosure of which is incorporated by reference herein. Alternatively, the interface of a fan blade and a fan hub may include any other component or components, or may lack any similar structure at all.

Fans may also include a variety of mounting structures. For instance, a fan mounting structure is disclosed in U.S. Non-Provisional patent application Ser. No. 12/203,960, entitled "Ceiling Fan with Angled Mounting," filed Sep. 4, 2008, the disclosure of which is incorporated herein. In addition, a fan may include sensors or other features that are used to control, at least in part, operation of a fan system. For instance, such fan systems are disclosed in U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein; PCT Patent Application Serial No. PCT/US09/32935, entitled "Automatic Control System for ceiling fan Based on Temperature Differentials," filed Feb. 3, 2009, the disclosure of which is incorporated by reference herein; and U.S. Non-Provisional patent application Ser. No. 12/336,090, entitled "Automatic Control System to Minimize Oscillation in Ceiling Fans," filed Dec. 16, 2008, the disclosure of which is incorporated by reference herein. Alternatively, any other suitable mounting structures and/or fan systems may be used in conjunction with embodiments described herein.

While a variety of fans and fan systems have been made and used, it is believed that no one prior to the inventors has made or used a fan system as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
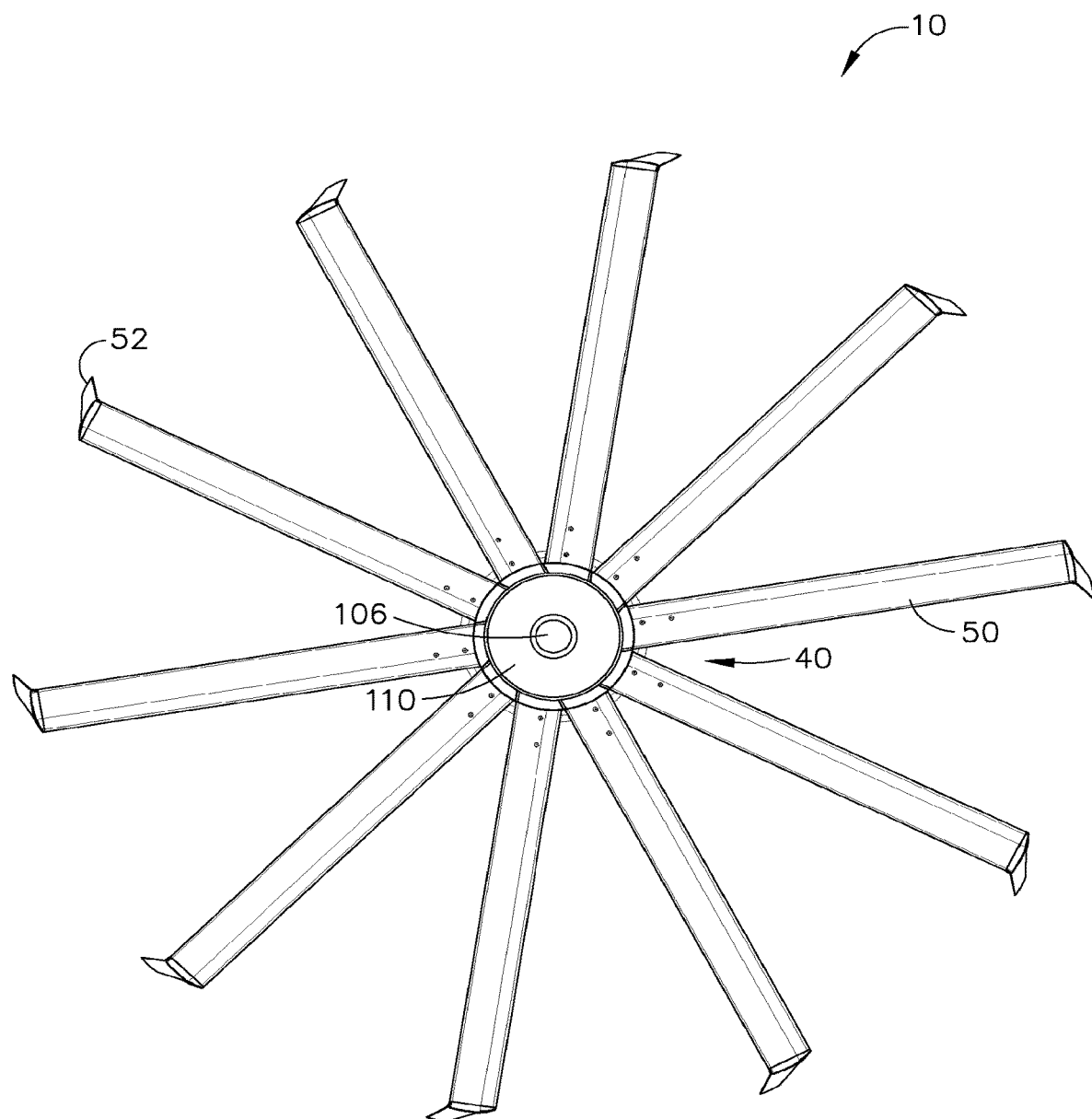
FIG. 1 depicts a bottom view of an exemplary fan system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Fan System Overview

Figure 2:
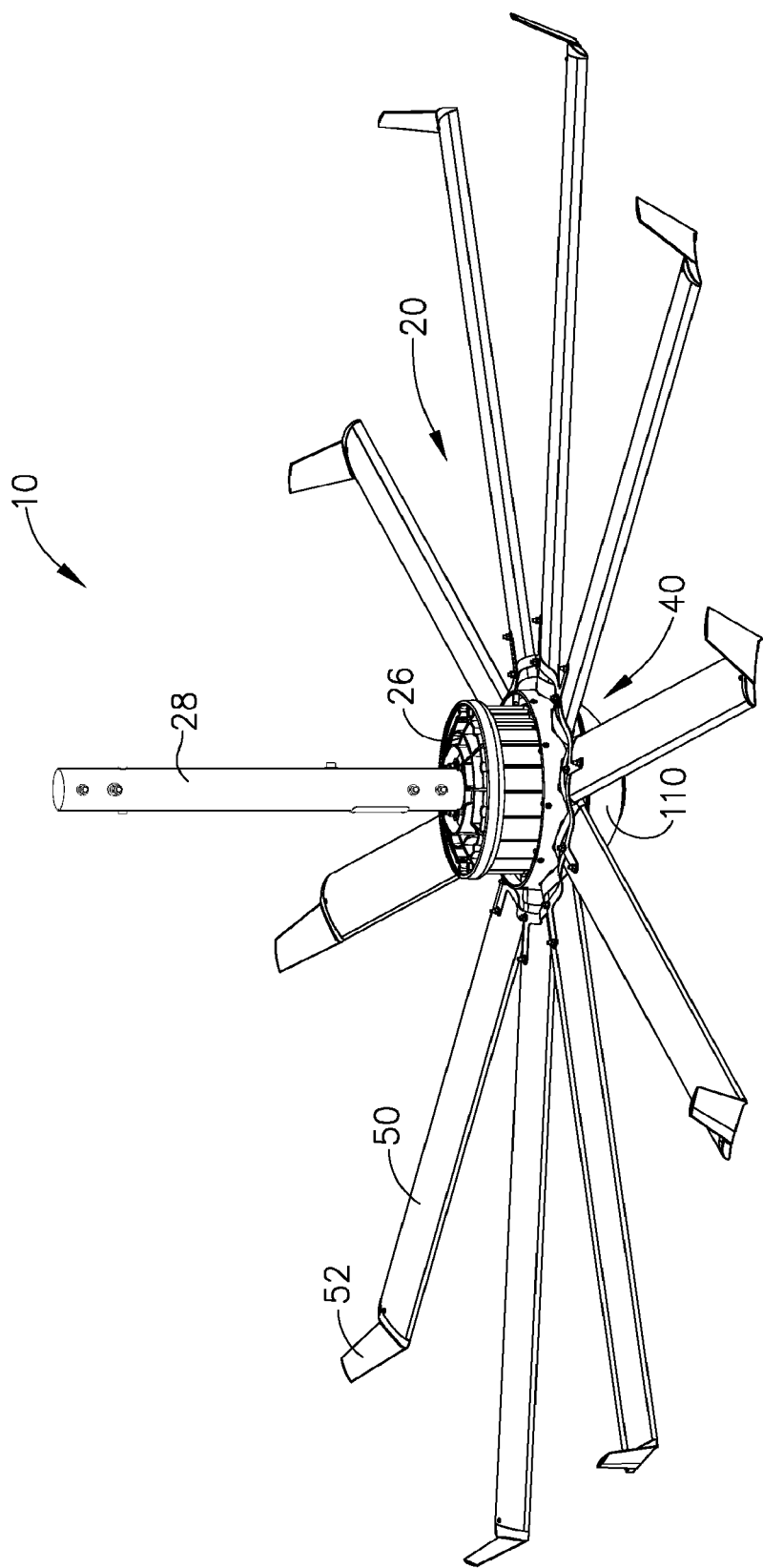
FIG. 2 depicts a perspective view of the fan system of FIG. 1.
Figure 3:
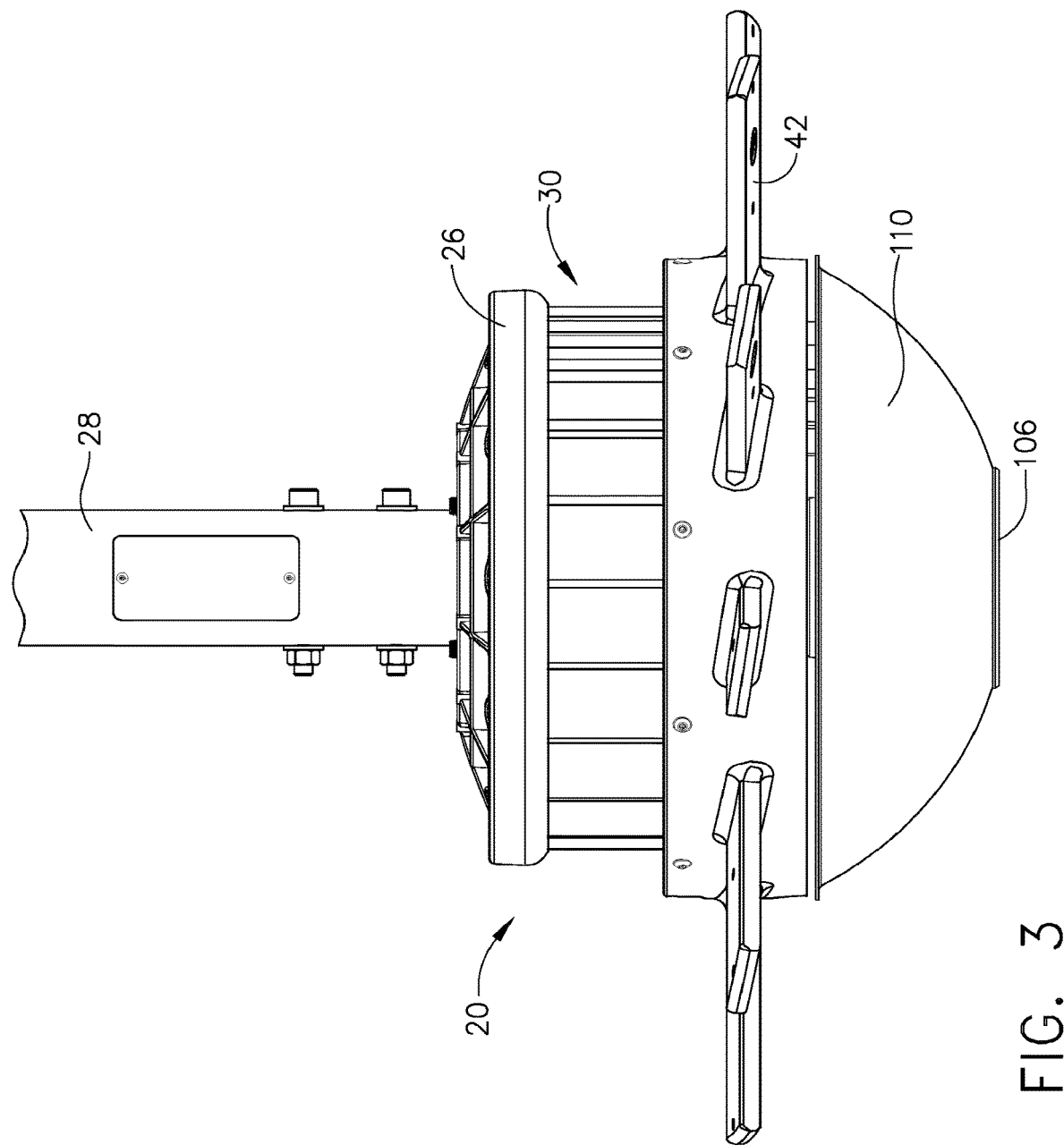
FIG. 3 depicts a side view of a hub assembly of the fan system of FIG. 1, with the fan blades removed.
Figure 11:
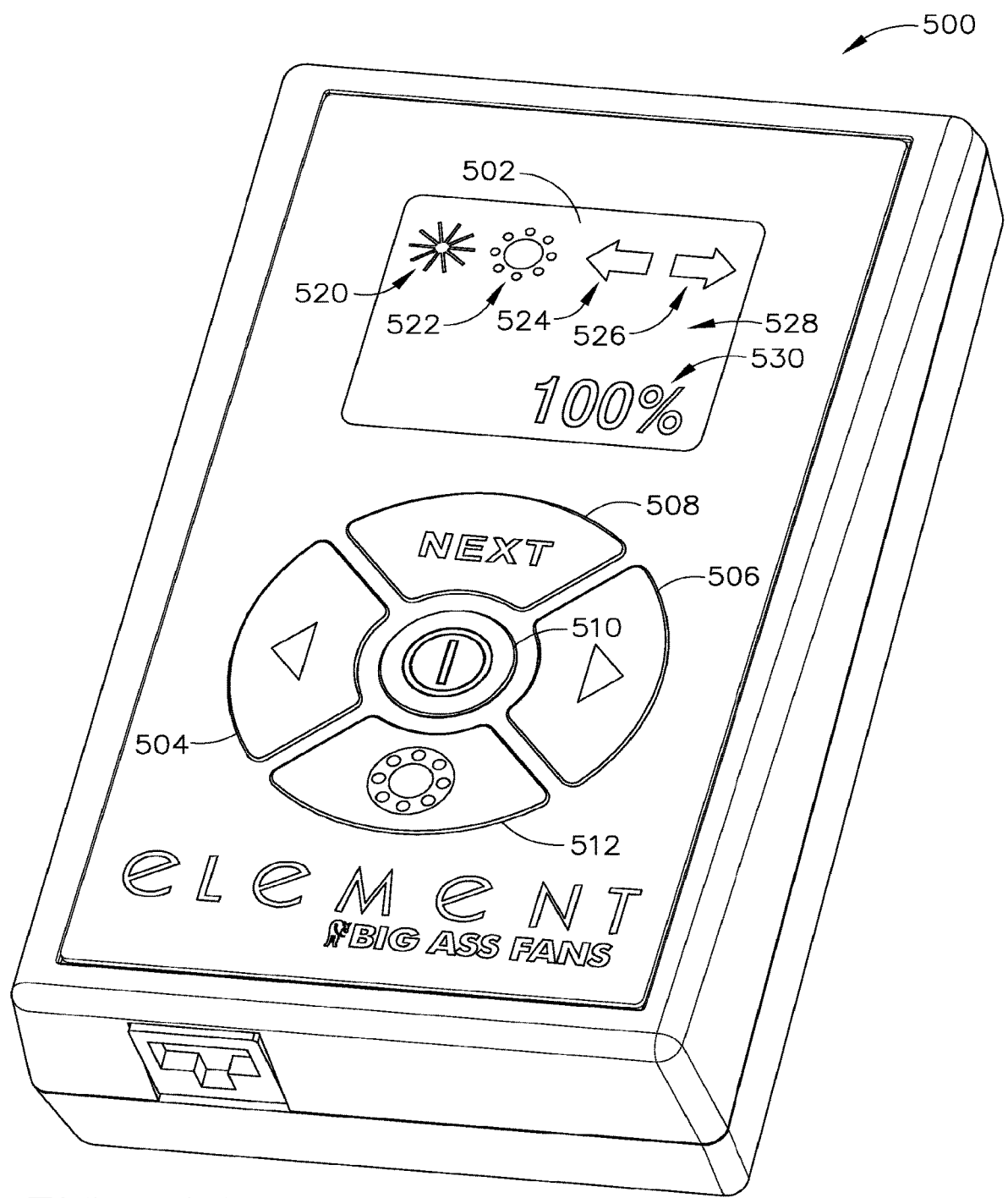
FIG. 11 depicts an exemplary control panel on a remote control device for the fan system of FIG. 1.

As shown in FIGS. 1-2 and 11, the fan system (10) of the present example includes a fan that comprises a motor (20), a hub (40), and blades (50); and a remote control (500). In the present example, fan (10) (i.e., with blades (50)) has a diameter of approximately 12 feet. In other variations, fan (10) has a diameter between approximately 6 feet, inclusive, and approximately 24 feet, inclusive. Alternatively, the fan may have any other suitable dimensions. Each of the foregoing components, among others, will be described in greater detail below, as well as various ways in which fan (10) may be operated. It should be understood, however, that the components described below are mere examples. Such components may be varied, modified, substituted, supplemented, or omitted as desired. Various ways in which components described below may be varied, modified, substituted, supplemented, or omitted, as well as ways in which operation of fan (10) may be varied, modified, or supplemented, will be apparent to those of ordinary skill in the art in view of the teachings herein.

Fan Blades

A variety of types of fan blades (50) may be used with fan system (10) of the present example. For instance, fan blades (50) have an airfoil shape in the present example, and may be configured in accordance with the teachings of U.S. Pat. No. 7,284,960, entitled "Fan Blades," issued Oct. 23, 2007; U.S. Pat. No. 6,244,821, entitled "Low Speed Cooling Fan," issued Jun. 12, 2001; and/or U.S. Pat. No. 6,939,108, entitled "Cooling Fan with Reinforced Blade," issued Sep. 6, 2005. The disclosures of each of those U.S. patents are incorporated by reference herein. As another merely illustrative example, fan blades (50) may be configured in accordance with the teachings of U.S. Pub. No. 2008/0008596, entitled "Fan Blades," published Jan. 10, 2008, the disclosure of which is also incorporated by reference herein. As yet another merely illustrative example, fan blades (50) may be configured in accordance with the teachings of U.S. Provisional Application No. 61,109,220, entitled "Multi-Part Modular Airfoil Section and Method of Attachment Between Parts," filed Oct. 29, 2008, the disclosure of which is incorporated by reference herein. Alternatively, any other suitable configurations for fan blades (50) may be used in conjunction with embodiments described herein.

In the present example, fan blades (50) are formed of aluminum through an extrusion process, and have a substantially uniform cross-section along their length. However, it should be understood that fan blades (50) may be made of any other suitable material or materials, including combinations thereof. By way of example only, fan blades may be formed of a combination of a metal and a plastic, a foam core with a durable outer skin, or any other suitable material or combination of materials. Similarly, any suitable method of forming fan blades (50) may be used, including but not limited to roll forming, molding, stamping and bending, etc. Fan blades (50) may even be twisted, if desired, and may have a non-uniform cross section if desired.

In addition, fan blades (50) that are used with fan system (10) of the present example may include a variety of modifications. For instance, the outer tip of each fan blade (50) may be finished by the addition of an aerodynamic tip or winglet (52). By way of example only, winglets (52) may be configured in accordance with the teachings of U.S. Pat. No. 7,252,478, entitled "Fan Blade Modifications," issued Aug. 7, 2007, the disclosure of which is incorporated by reference herein. As another merely illustrative example, winglets (52) may be configured in accordance with the teachings of U.S. Pub. No. 2008/0014090, entitled "Cuffed Fan Blade Modifications," published Jan. 17, 2008, filed Sep. 25, 2007, the disclosure of which is incorporated by reference herein. As yet another merely illustrative example, winglets (52) may be configured in accordance with the teachings of U.S. Design Pat. No. D587,799, entitled "Winglet for a Fan Blade," issued Mar. 3, 2009, the disclosure of which is incorporated by reference herein.

In still other variations, an angled extension may be added to the free end of each fan blade (50), such as the angled airfoil extensions described in U.S. Pub. No. 2008/0213097, entitled "Angled Airfoil Extension for Fan Blade," published Sep. 4, 2008, the disclosure of which is incorporated by reference herein. Other suitable structures that may be associated with an outer tip of each fan blade (52) will be apparent to those of ordinary skill in the art in view of the teachings herein. Alternatively, the outer tip of each fan blade (50) may be simply closed or capped, or may lack any similar structure at all.

Fan Hub

As shown in FIGS. 3-7 and 9, the fan hub (40) of the present example includes a plurality of tab-like mounting members (42). Each mounting member (42) is configured to receive a respective fan blade (50). Fan blades (50) may be secured to mounting members (42) using any suitable structures or techniques, including but not limited to one or more bolts (304) or other fasteners. For instance, as shown in FIGS. 14-17, fan system (10) may include blade retention components that are configured to retain blades (50). In particular, several retainer members (300) may be joined relative to each blade (50) using bolts (304) or any other suitable fasteners. Retainer members (300) are configured to provide a safety feature for fan system (10). In particular, each retainer member (300) is joined to two adjacent mounting members (42) and two adjacent fan blades (50), as will be described in greater detail below. In the event that a fan blade (50) breaks free of its mounting member (42), the retainer members (300) that are secured to that fan blade (50) may prevent the fan blade (50) from falling to the ground or otherwise flying free of fan system (10). Similarly, in the event that a mounting member (42) breaks free from hub (40), the retainer members (300) that are secured to that mounting member (42) will prevent the mounting member (42) (and the fan blade (50) that is coupled with that mounting member (42)) from falling to the ground or otherwise flying free of fan system (10).

Figure 14:
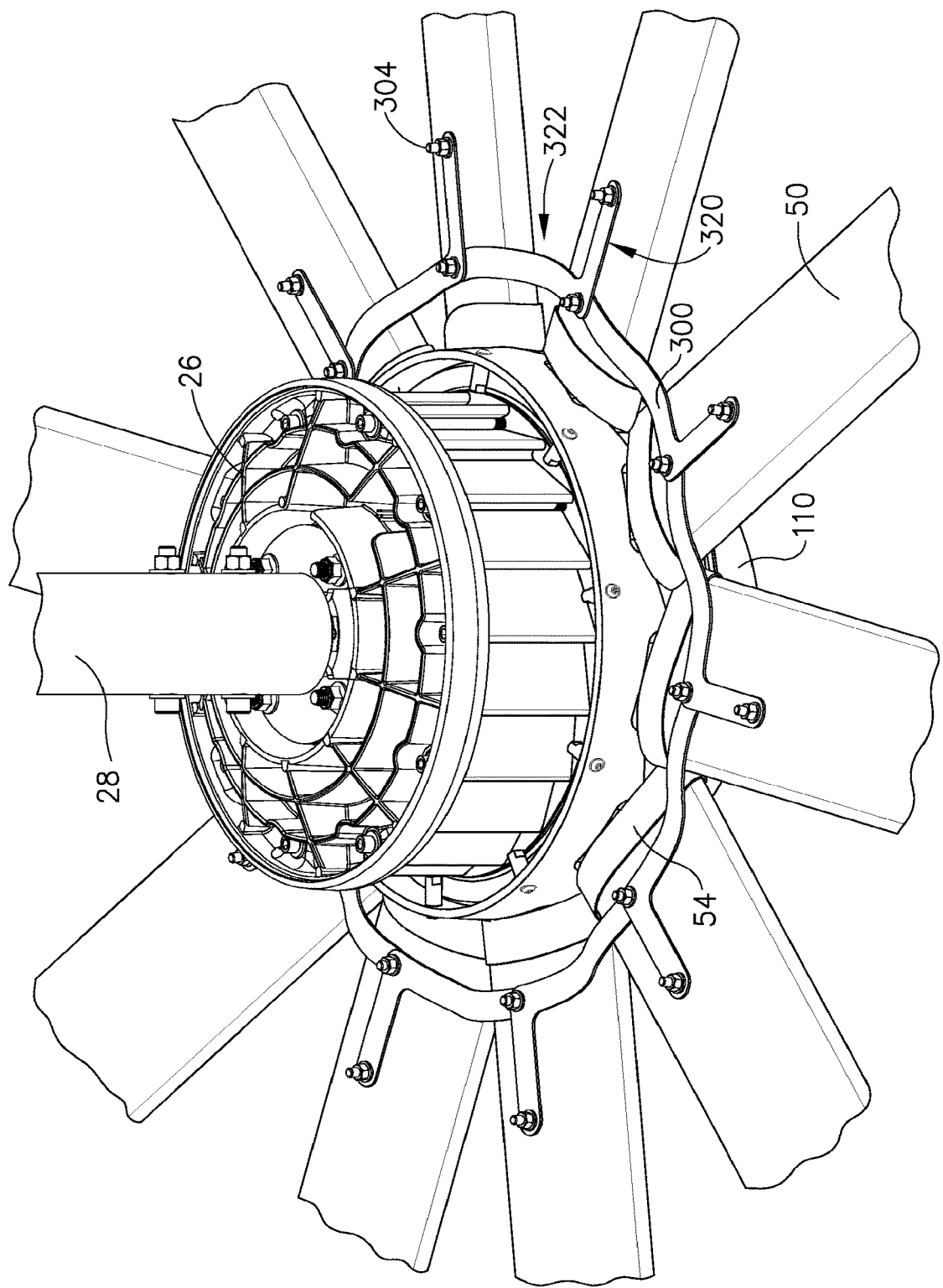
FIG. 14 depicts a partial top perspective view of the fan system of FIG. 1, showing fan blade retention features.
Figure 17:
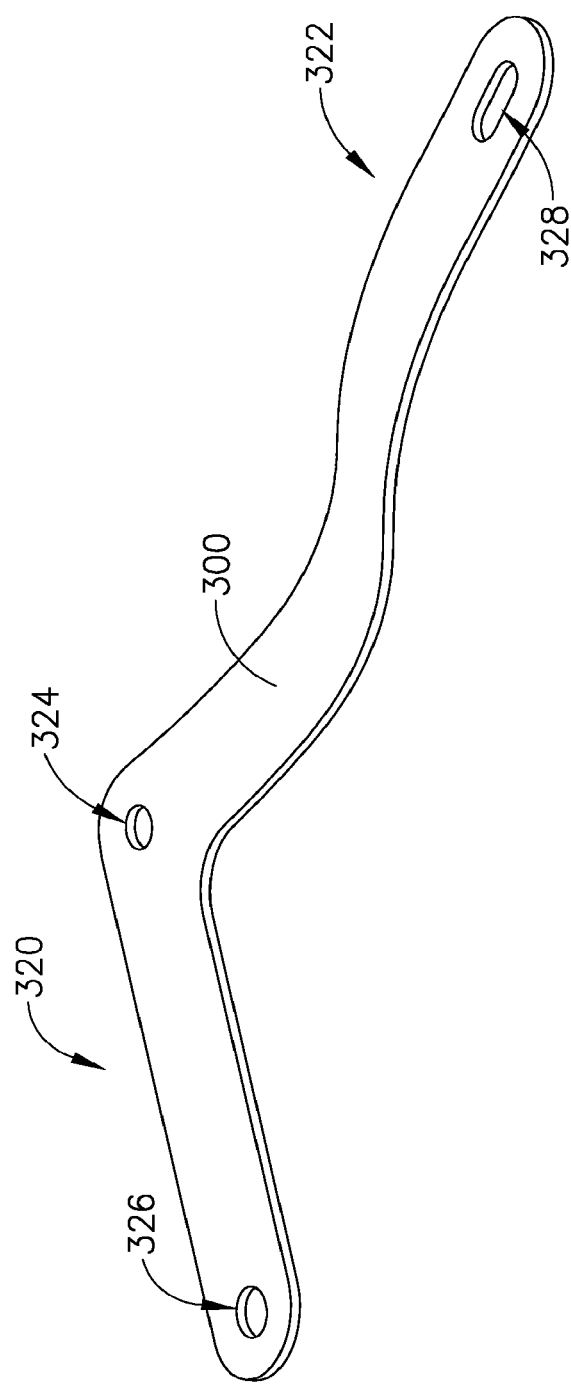
FIG. 17 depicts a perspective view of the blade retention member of FIGS. 14-16.

As shown in FIG. 17, retainer members (300) may be formed of metal that is stamped into an "L" shape, then bent to facilitate overlapping of adjacent retainer members (300). Of course, any other suitable material(s) and/or method(s) of manufacture may be used. The "L" shape of retainer members (300) in the present example provides a radial portion (320) and a circumferential portion (322). In particular, when retainer members (300) are incorporated into fan system (10) as shown in FIG. 14, radial portions (320) extend radially outward relative to the axis about which fan blades (50) are rotated; while circumferential portions (322) extend circumferentially about that axis. Circumferential portions (322) may be arcuate, such that circumferential portion (322) is not necessarily a straight edge defining a perfectly right angle with radial portion (320). An opening (324) is formed at the corner defined by radial and circumferential portions (320, 322) in this example. Similarly, an opening (326) is formed at the free end of radial portion (320); while another opening (328) is formed at the free end of circumferential portion (322). It should be understood, however, that retainer members (300) may have any other suitable configuration. Alternatively, retainer members (300) may be supplemented or even omitted altogether, if desired.

Figure 16:
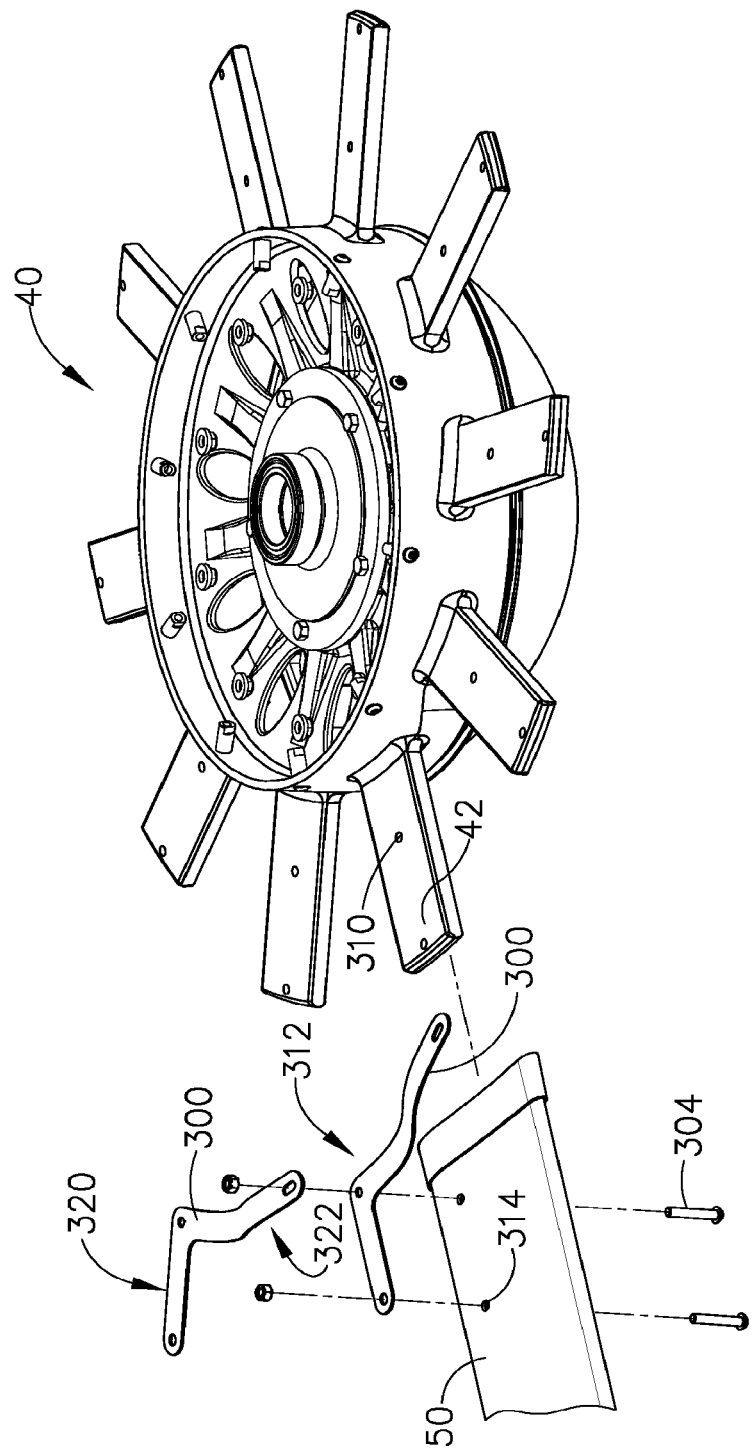
FIG. 16 depicts an exploded view showing the fan blade retention features of FIGS. 14-15.

As shown in FIG. 16, when mounting a blade (50) to hub (40), the blade (50) may be slid onto a mounting member (42), such that openings (314) in the blade (50) line up with openings (310) in the mounting member (42). Two upper retainer members (300) may be positioned above the blade (50). In particular, the end of the circumferential portion (322) of a first retainer member (300) may be positioned over the blade (50); while the radial portion (320) of a second retainer member (300) may be positioned above that part of the circumferential portion (322) of the first retainer member (300). In this example, the opening (328) of the first retainer member (300) aligns with complementary openings (310, 314) of mounting member (42) and fan blade (50). The opening (324) of the second retainer member (300) aligns with those same openings (310, 314, 328); while the opening (326) of the second retainer member (300) aligns with the other complementary openings (310, 314) of mounting member (42) and fan blade (50). The end of the circumferential portion (322) of the first retainer member (300) is "sandwiched" between the radial portion (320) of the second retainer member (300) and the fan blade (50), such that the radial portion (320) of the second retainer member (300) overlaps the end of the circumferential portion (322) of the first retainer member (300). A first bolt (304) is then inserted through aligned openings (310, 314, 326); and a second bolt (304) is inserted through aligned openings (310, 314, 324, 328). This process may be repeated until all blades (50) are secured to the hub (40).

As another merely illustrative example, one or more wires, cables, or other components may be fed through the interior of each fan blade (50). Using an example with a wire, one end of the wire may be secured to hub (40) while the other end of the wire may be secured to the free end of fan blade (50). Such a wire, cable, or other component(s) may thus provide additional safety retention, such as when a mounting member (42) breaks free from hub (40), etc. Like retainer members (300), such a wire, cable, or other component(s) may have sufficient strength to bear the weight of at least one fan blade (50), and sufficient strength to withstand snapping and/or binding action that may occur when a blade (50) breaks free from hub (40), when a mounting member (42) breaks free from hub (40), etc. Furthermore, such a wire, cable, or other component(s) may be used in addition to or in lieu of retainer members (300).

Of course, a variety of other structures and techniques may be used to secure fan blades (50) to hub (40). By way of example only, any suitable type of fastener other than bolts (304) may be used, including but not limited to rivets, screws, welding, adhesives, epoxies, snap fittings, interference fittings, etc., including combinations thereof. Furthermore, retainer members (300) may be modified, substituted, or supplemented in any suitable fashion, if not omitted altogether.

Figure 9:
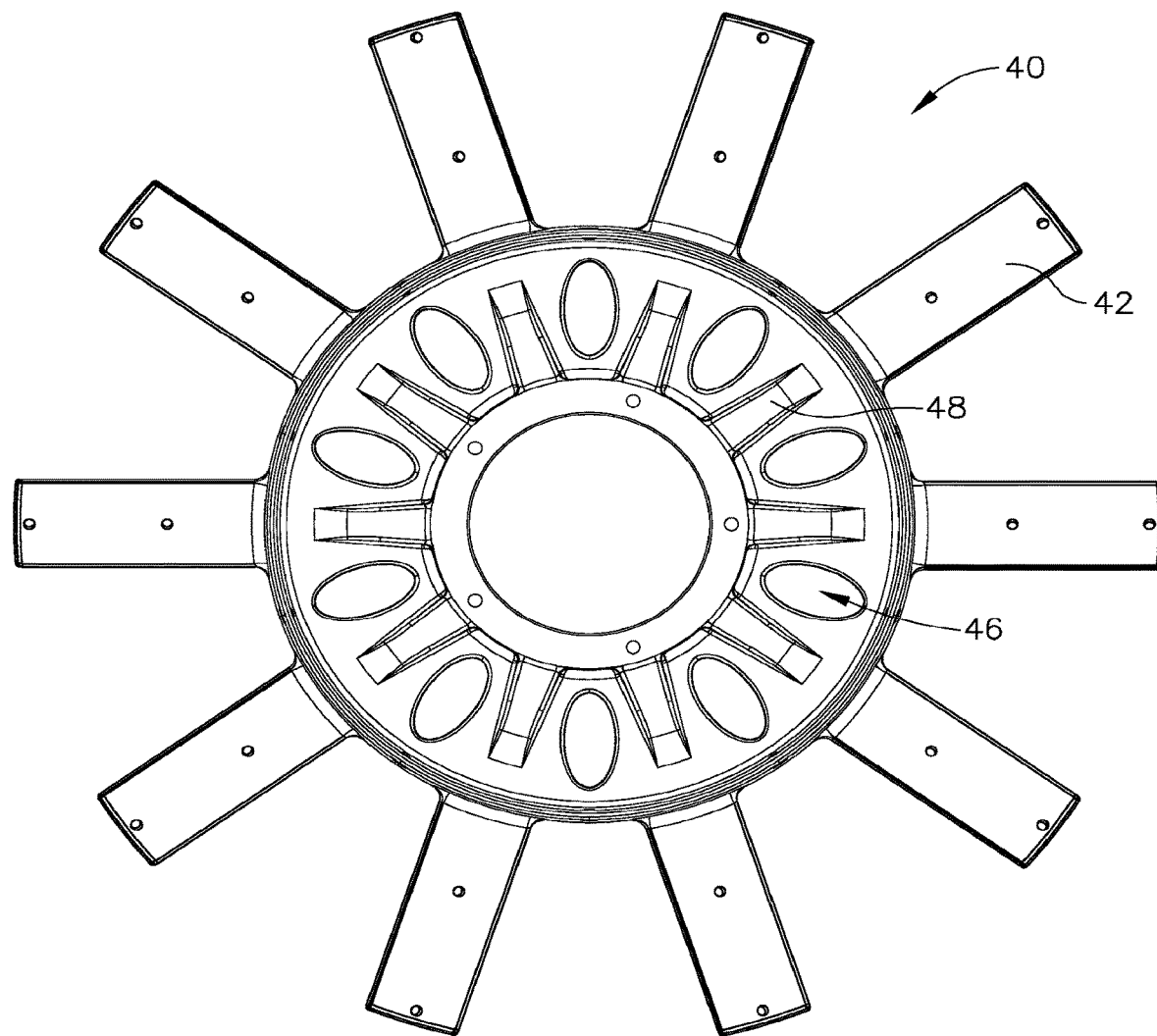
FIG. 9 depicts a bottom view of a hub of the fan system of FIG. 1.

As shown in FIG. 9, hub (40) of the present example also includes several openings (46) formed therethrough. While openings (46) of this example have a substantially elliptical shape, it will be appreciated that other shapes may be used (e.g., trapezoidal, circular, elongate slits or slots, triangular, square, etc.). Openings (46) are configured to permit airflow through hub (40). In particular, openings (46) provide a path for heat to escape from motor (20) (above hub) and/or heat to escape from control electronics (below hub), which will be described in greater detail below. While openings (46) are shown as extending generally radially outwardly relative to the center of hub (40), it should be understood that openings (46) may have any other suitable orientation (e.g., circumferential), to the extent that openings (46) have any perceivable orientation at all. A plurality of ribs (48) extend radially from the center opening of hub (40), between adjacent openings (46), providing additional rigidity for hub (40). Of course, like openings (46), ribs (48) are merely optional.

In addition or as an alternative to openings (46) in hub (40), one or more openings may also be provided through bell (26) of motor (20) and/or through any other component of motor (20). By way of example only, an opening formed through bell (26) may generate a funneling effect through one or more openings formed in rotor (22) and/or through openings (46) in hub (40). As another merely illustrative example, openings (46) in hub (40) may port air through the internal windings of motor (20) (e.g., where a motor (20) having an open frame is used). It will be appreciated that, in some instances, sufficient ventilation of motor (20) may enable motor (20) to operate at a cooler temperature (e.g., providing longer motor (20) life, etc.) and/or to operate at a higher torque level on a continuous basis. As yet another merely exemplary modification, the windings of stator (24) of motor (20) may be provided with an overmold to improve thermal dissipation capabilities. Such an overmold material may improve thermal conductivity between wires of the windings and the housing of stator (24), which may in turn improve thermal conduction to the outside housing. Other suitable structures, modifications, and techniques for providing desired thermal performance will be apparent to those of ordinary skill in the art in view of the teachings herein.

As is also shown, mounting members (42) are oriented at an angle of attack. By way of example only, such an angle of attack may be approximately 8 degrees. Alternatively, an angle of attack for mounting members (42) may be between approximately 6 degrees, inclusive, and approximately 10 degrees, inclusive. Alternatively, an angle of attack for mounting members (42) may be between approximately 2 degrees, inclusive, and approximately 14 degrees, inclusive. The angle of attack for mounting members (42) may alternatively be approximately zero, may be less than zero (e.g., applying a negative sign before any of the above-noted values or ranges), or may have any other suitable value or fall within any other suitable range. It should be understood, however, that fan blades (50) that are mounted to mounting members (42) need not necessarily have the same angle of attack as mounting members (42).

Furthermore, there are a number of ways in which an "angle of attack" for a fan blade (50) may be defined. For instance, under one definition, such as where a fan blade (50) has a concave lower surface, an angle of attack may be measured based on a plane extending from the lowermost point near the leading edge of the fan blade (50) and the lowermost point of the trailing edge of the fan blade (50) (e.g., as if a flat plate were placed across the bottom of the fan blade (50)). An angle of attack for the fan blade (50) may be viewed as the angle of such a plane relative to a horizontal axis. Under such a definition, in some versions of the fan system (10), the angle of attack may be approximately 6.54 degrees or approximately 6.5 degrees. Alternatively, this angle of attack may be between approximately 4.5 degrees, inclusive, and approximately 8.5 degrees, inclusive. Alternatively, this angle of attack may be between approximately 2 degrees, inclusive, and approximately 8 degrees, inclusive. Alternatively, this angle of attack may be between approximately zero degrees, inclusive, and approximately 10 degrees, inclusive; or between approximately −1.7 degrees, inclusive, and approximately 10.3 degrees, inclusive. This angle of attack may alternatively be approximately zero, may be less than zero (e.g., applying a negative sign before any of the above-noted positive values or ranges; indicating that the leading edge is vertically positioned lower than the trailing edge of fan blade (50)), or may have any other suitable value or fall within any other suitable range.

Yet another way in which angle of attack for fan blades (50) may be defined includes the angle defined between the chord of a fan blade (50) and a horizontal axis. Under this definition, in some versions of fan system (10), the angle of attack may be approximately 7.16 degrees or approximately 7.2 degrees. Alternatively, this angle of attack may be between approximately 5 degrees, inclusive, and approximately 9 degrees, inclusive; or between approximately 5.2 degrees, inclusive, and approximately 9.2 degrees, inclusive. Alternatively, this angle of attack may be between approximately 3 degrees, inclusive, and approximately 11 degrees, inclusive. Alternatively, this angle of attack may be between approximately −1.0 degrees, inclusive, and approximately 11.0 degrees, inclusive; or between approximately −1 degrees, inclusive, and approximately 12 degrees, inclusive. This angle of attack may alternatively be approximately zero, may be less than zero (e.g., applying a negative sign before any of the above-noted positive values or ranges; indicating that the leading edge is vertically positioned lower than the trailing edge of fan blade (50)), or may have any other suitable value or fall within any other suitable range.

Suitable configurations for mounting members (42) and fan blades (50) for providing any of the above described angles of attack (under any definition) will be apparent to those of ordinary skill in the art in view of the teachings herein. For instance, to the extent that fan blades (50) are hollow, and mounting members (42) are inserted into the interior of fan blades (50), a variety of structures within fan blades (50) may yield a variety of relationships between the angle of attack of a mounting member (42) and the angle of attack of a fan blade (50). In other words, these angles of attack do not need to be identical, though they may be if desired.

Figure 15A:
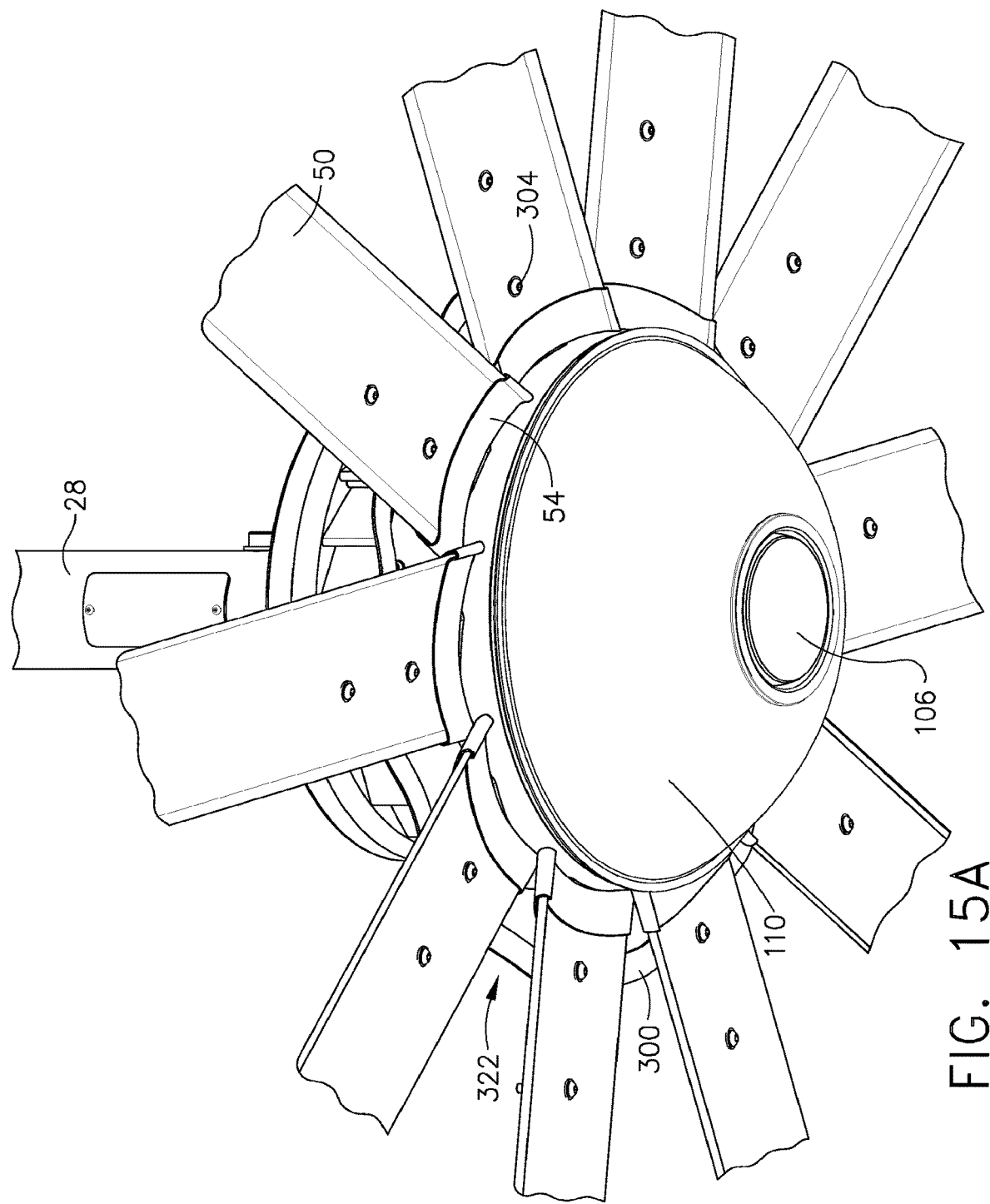
FIG. 15A depicts a partial bottom perspective view of the fan system of FIG. 1, showing fan blade retention features.
Figure 15B:
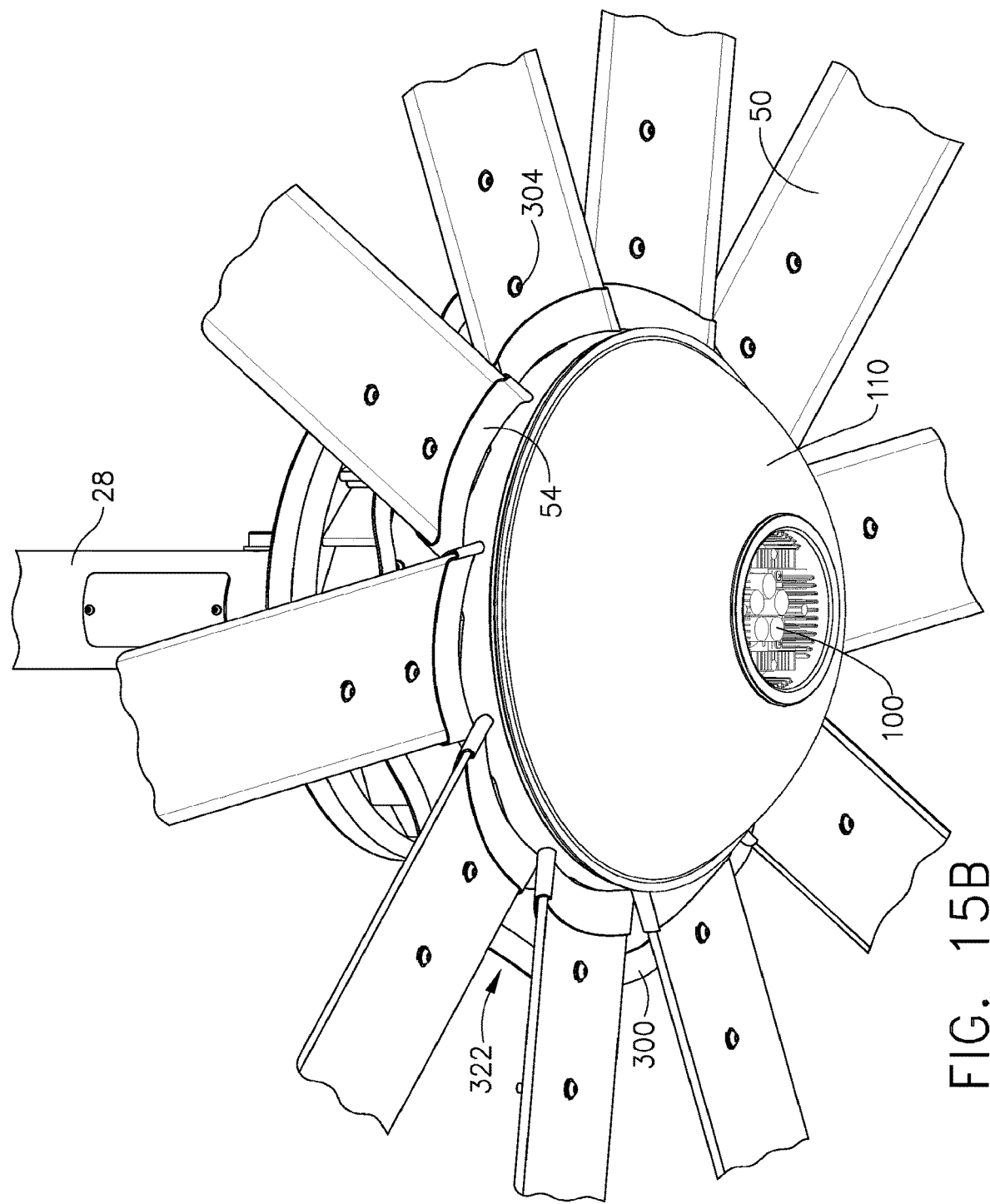
FIG. 15B depicts a partial bottom perspective view of the fan system of FIG. 1, showing fan blade retention features, and with a light cover removed.

The interface of each fan blade (50) and fan hub (40) of the present example may also be provided in a variety of ways. For instance, and as shown in FIGS. 14-16, an interface component (54) is provided at the interface of each fan blade (50) and fan hub (40) in the present example. By way of example only, interface component (54) may be configured in accordance with the teachings in U.S. Non-Provisional patent application Ser. No. 12/233,783, entitled "Aerodynamic Interface Component for Fan Blade," filed Sep. 19, 2008, the disclosure of which is incorporated by reference herein. Of course, interface component (54) may have any other suitable configuration. Alternatively, the interface of a fan blade (50) and a fan hub (40) may include any other component or components, or may lack any similar structure at all.

Motor

Figure 7:
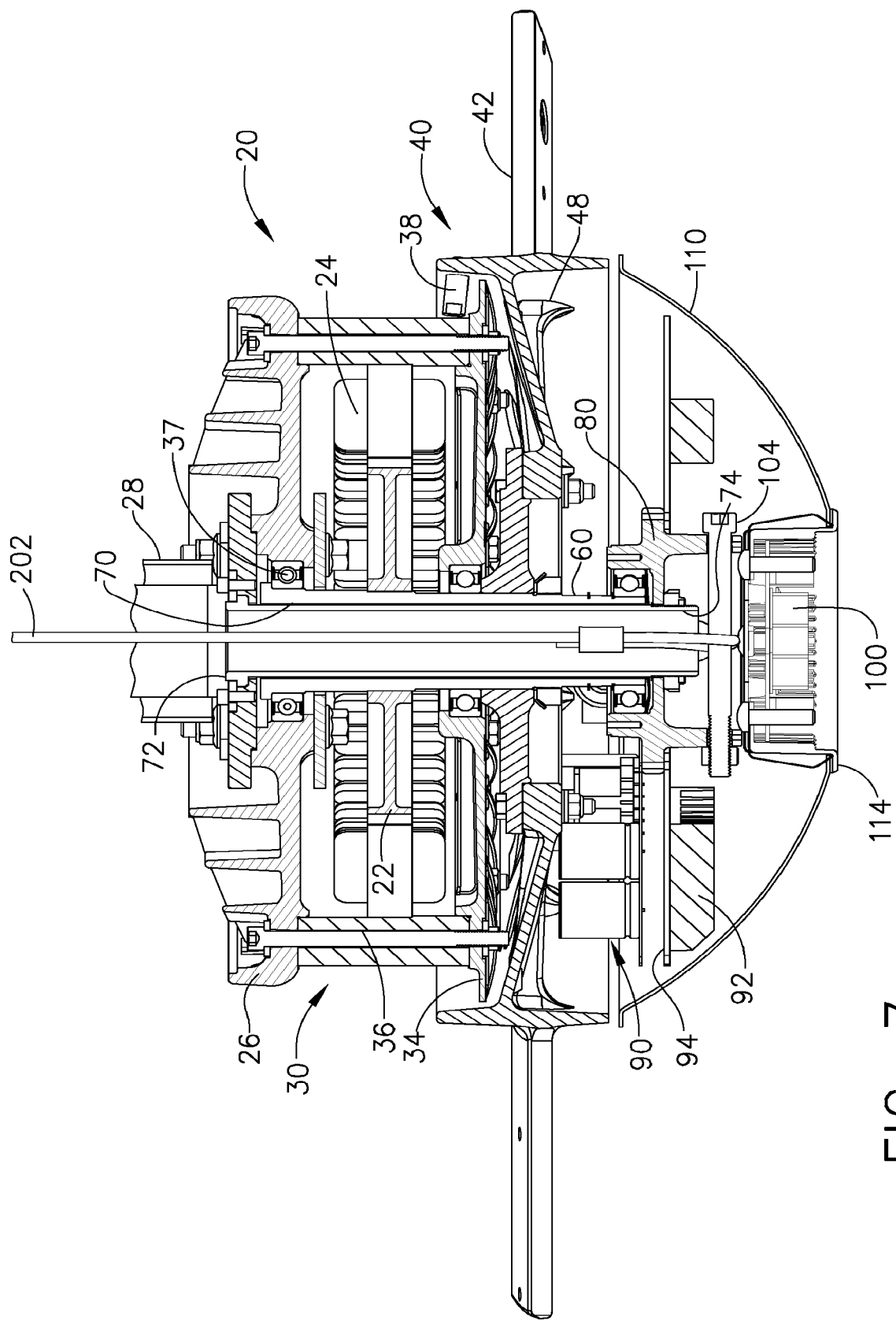
FIG. 7 depicts a cross-sectional view of the hub assembly of FIG. 3.

In the present example, motor (20) is a permanent magnet brushless DC motor. In particular, and as shown in FIG. 7, motor (20) has an inner, permanent magnet rotor (22) and an external stator (24) that includes selectively commutated windings. Of course, any other suitable motor construction, brushed, brushless or otherwise, including but not limited to a brushless motor (20) with an external rotor (22) rotating about an internal stator (24), may be used. In some versions, motor (20) has a back EMF constant that is equal to or greater than approximately 0.55 VRMS/KPRM per every 1 VDC applied bus voltage to the windings of stator (24). For instance, back EMF may refer to back electromotive force; while VRMS may refer to volts root mean square; while KRPM may refer to thousand revolutions per minute; while VDC may refer to volts of direct current. Alternatively, motor (20) may have any other suitable performance characteristics.

Motor (20) in the present example is provided within a housing. The housing of this example substantially and sealingly encloses rotor (22) and stator (24), such that motor (20) is completely enclosed and not ventilated. Of course, in other versions, motor (20) may be ventilated, and does not necessarily need to be sealed. The top portion of the housing, provided as a bell (26), is mounted to a hanging fixture (28), which is in turn mounted to a ceiling (210) as will be described in greater detail below. In some versions, hanging fixture (28) comprises a metal tube. Another merely exemplary hanging fixture (28) is disclosed in U.S. Pub. No. 2008/0213097, entitled "Angled Airfoil Extension for Fan Blade," published Sep. 4, 2008, the disclosure of which is incorporated by reference herein. Still other suitable hanging fixtures (28) and other structures/techniques for securing fan system (10) to a ceiling (210) or elsewhere will be apparent to those of ordinary skill in the art in view of the teachings herein.

Figure 8:
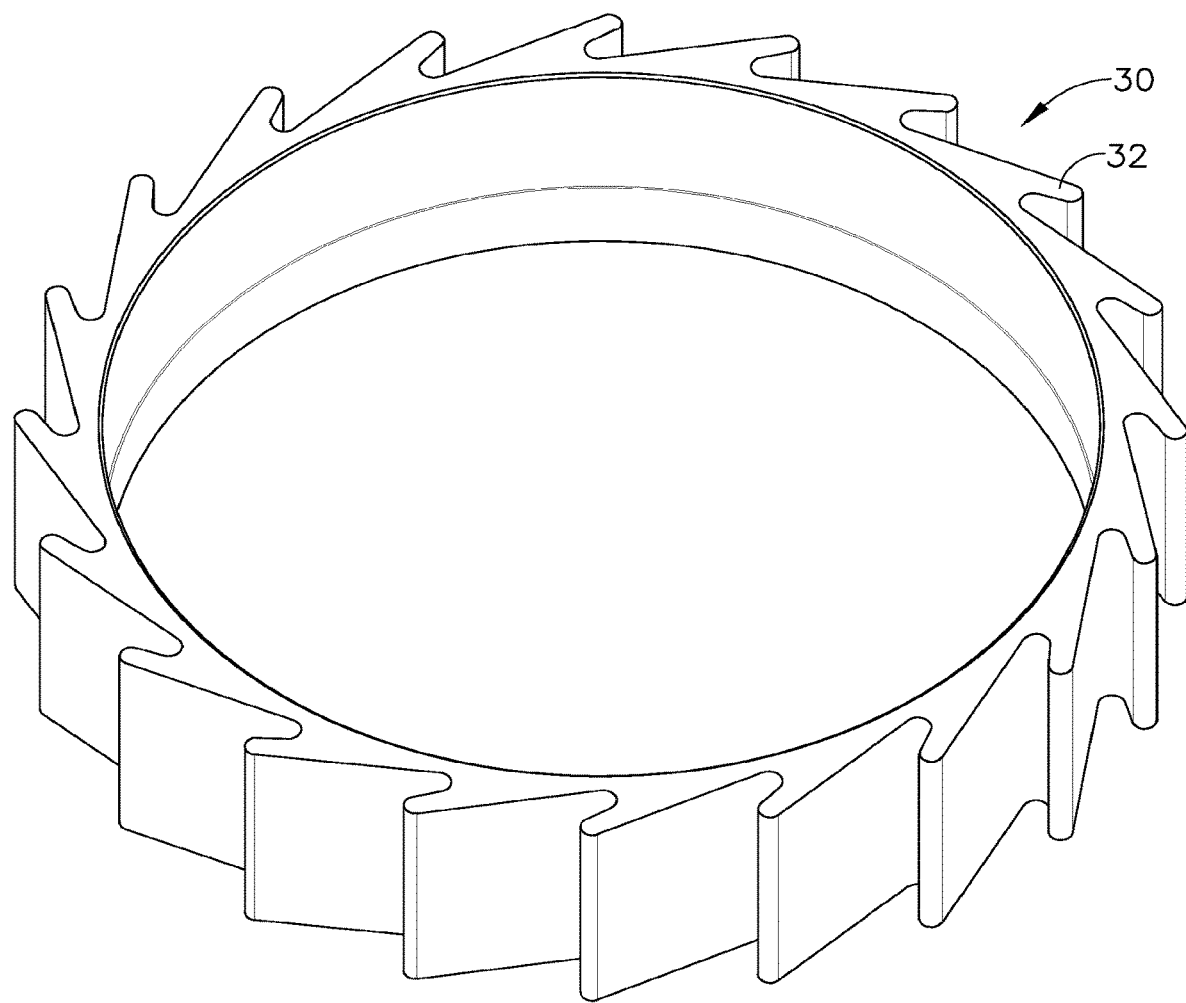
FIG. 8 depicts a perspective view of a motor heat sink of the fan system of FIG. 1.

The housing for motor (20) may be further defined by a heat sink (30). As shown in FIG. 8, heat sink (30) of this example comprises a plurality of cooling fins (32), which extend generally tangentially from the exterior of heat sink (30). In particular, fins (32) are oriented such that they extend counterclockwise (when viewing fan (10) from a floor, looking toward ceiling (210)). It should be understood that a tangential configuration of cooling fins (32) may provide an increased surface area, which may directly relate to the thermal dissipation ability (e.g., measured in degrees Celsius per Watt) of heat sink (30), and which may thereby minimize the heat rise associated with motor (20). Alternatively, fins (32) may have any other suitable orientation or configuration. While motor (20) of the present example may generate significant heat, which might otherwise suggest against including a housing that substantially encloses and seals the motor (20), the presence of cooling fins (32) may provide sufficient heat dissipation to permit such a housing configuration. Of course, motor (20) may have any other suitable housing, such that bell (26) and heat sink (30) may be modified, substituted, or supplemented as desired.

Motor (20) of the present example uses ball bearings (not shown), though any other suitable bearings (e.g., tapered roller bearings) or substitutes thereof may be used. For instance, fan (10) may also include a plurality of ball and/or roller bearings elsewhere, such as between hollow drive shaft (60) (described below) and stationary sleeve (70) (also described below).

In the present example, the configuration of motor (20) and other components permits fan (10) to be operated in accordance with the teachings herein without a gearbox being present. In other words, rotor (22) drives hub (40) directly via drive shaft (60) in this examples. Of course, in other variations, a gearbox or any other components between rotor (22) and hub (40) may be used.

The configuration of motor (20) of the present example also provides a degree of modularity, such that two or more rotors (22) and stators (24) may be coaxially stacked along a common shaft. For instance, two or more rotors (22) and stators (24) may be stacked along a common shaft in response to torque demands or other considerations. Such stacking may eliminate a need to otherwise include extra gears or other components. In addition, heat sink (30) is extruded in the present example. Thus, the same housing die may be used to produce various housings to accommodate motors (20) that vary in length due to stacking of rotors (22) and stators (24).

Motor (20) of the present example may have any number of properties in common with the motor described in U.S. Pat. No. 6,710,505, entitled "Direct Drive Inside-Out Brushless Roller Motor," issued Mar. 23, 2004, the disclosure of which is incorporated by reference herein. For instance, motor (20) may develop a relatively high back EMF in such a manner as to provide a relatively high ratio of stator (24) voltage to rotor (22) speed. For some versions of a motor (20), if the back EMF of motor (20) is decreased, the effective amount of torque per applied amp to motor (20) may decrease linearly. In the present example, the coils of stator (24) may be formed of a number of turns and a gauge of wire that is selected to produce a ratio of stator (24) voltage to rotor (22) speed of at least approximately 10 RMS volts per 1000 RPM for an applied stator (24) voltage of 24 RMS volts per phase. Similarly, motor (20) may produce a stator (24) voltage to rotor (22) speed of at least approximately 20 RMS volts per 1000 RPM for an applied stator (24) voltage of approximately 48 RMS volts per phase. Thus, in some versions, a motor (20) in a fan (10) whose blades (50) provide a 12 foot diameter may have a BEMF that is around 1000 VRMS/KRPM. Furthermore, motor (20) may be constructed such that stator (24) coils are formed of a number of turns and a wire AWG selected to produce a ratio of stator (24) voltage to rotor (22) speed of at least approximately 250 VRMS per 1000 RPM for an applied bus voltage of approximately 400 VDC. The minimum ratio of stator (24) voltage to rotor (22) speed may be a direct ratio of applied bus voltage (e.g., the ratio of stator (24) voltage to rotor (22) speed may be at least approximately 50 VRMS for an applied bus voltage of approximately 160 VDC). Alternatively, motor (20) may yield any other suitable ratio of stator (24) voltage to rotor (22) speed, or have any other suitable properties.

In some versions (e.g., where fan (10) has blades (50) providing a 12 foot diameter), motor (20) may have a motor constant of approximately 700 oz.-in./$\sqrt{\text{(watt)}}$. Alternatively, the motor constant may be anywhere between approximately 650 oz.-in./$\sqrt{\text{(watt)}}$, inclusive and approximately 750 oz.-in./$\sqrt{\text{(watt)}}$, inclusive; between approximately 600 oz.-in./$\sqrt{\text{(watt)}}$, inclusive and approximately 800 oz.-in./$\sqrt{\text{(watt)}}$, inclusive; between approximately 550 oz.-in./$\sqrt{\text{(watt)}}$, inclusive and approximately 850 oz.-in./$\sqrt{\text{(watt)}}$, inclusive; between approximately 500 oz.-in./$\sqrt{\text{(watt)}}$, inclusive and approximately 900 oz.-in./$\sqrt{\text{(watt)}}$, inclusive; or within any other suitable range. To double the torque output of motor (20) on a continuous basis, the motor constant may be increased by approximately $\sqrt{(2)}(1.414)$ or by any other suitable factor. Other suitable motor constants for a motor (20) will be apparent to those of ordinary skill in the art in view of the teachings herein.

Hollow Drive Shaft and Stationary Sleeve

In the present example, and as shown in FIG. 7, motor (20) is operatively engaged with hub (40) via a hollow shaft (60). In particular, hollow shaft (60) is fixedly coupled with inner rotor (22) and hub (40). Hollow shaft (60) has a through bore providing an inner diameter of approximately 1.5 inches. In other variations, the diameter of the through bore is between approximately 2 inches, inclusive, and approximately 2.5 inches, inclusive. Of course, hollow shaft (60) may have a through bore of any other suitable diameter.

By way of example only, a merely illustrative drive shaft (60) configuration that may be used with fan system (10) of the present example is disclosed in U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein.

A stationary sleeve (70) is inserted through hollow drive shaft (60) in the present example. In particular, the top end (72) of sleeve (70) is secured to bell (26), which is provided as the top of motor (20) housing; while the bottom end (74) of sleeve (70) is secured to platform (80), which is described in greater detail below. Therefore, sleeve (70) remains stationary while hollow drive shaft (60) rotates during operation of fan (10). Sleeve (70) in this example is hollow, permitting items such as wires, fluid conduits (e.g., water pipes), etc., to be passed therethrough. Sleeve (70) of the present example has a through bore providing an inner diameter of approximately 1.5 inches, though any other suitable inner diameter may be provided. In the present example, wires (not shown) are passed through inner sleeve (70). Such wires may provide power and/or communication of commands/data to/from motor control module (90), which will be described in greater detail below. Such wires may also be coupled with lights (100), speakers, security devices, heat sensors (e.g., sensors configured to detect a rapid rise in temperature, as described in U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein; sensors configured to detect temperature exceeding a certain threshold, etc.), flame detectors (e.g., infrared and/or ultraviolet sensors, etc.), smoke detectors, or other components that are secured to platform (80) at the bottom of fan (10), which will be described in greater detail below. Still other suitable components that may be positioned within inner sleeve (70) will be apparent to those of ordinary skill in the art in view of the teachings herein. Furthermore, it will be appreciated that some variations may have no stationary inner sleeve (70), nothing passed through a hollow shaft (60), or may have no hollow shaft (60) at all (e.g., a solid shaft or some other structure or configuration is used, etc.).

Motor Control Module

Figure 10:
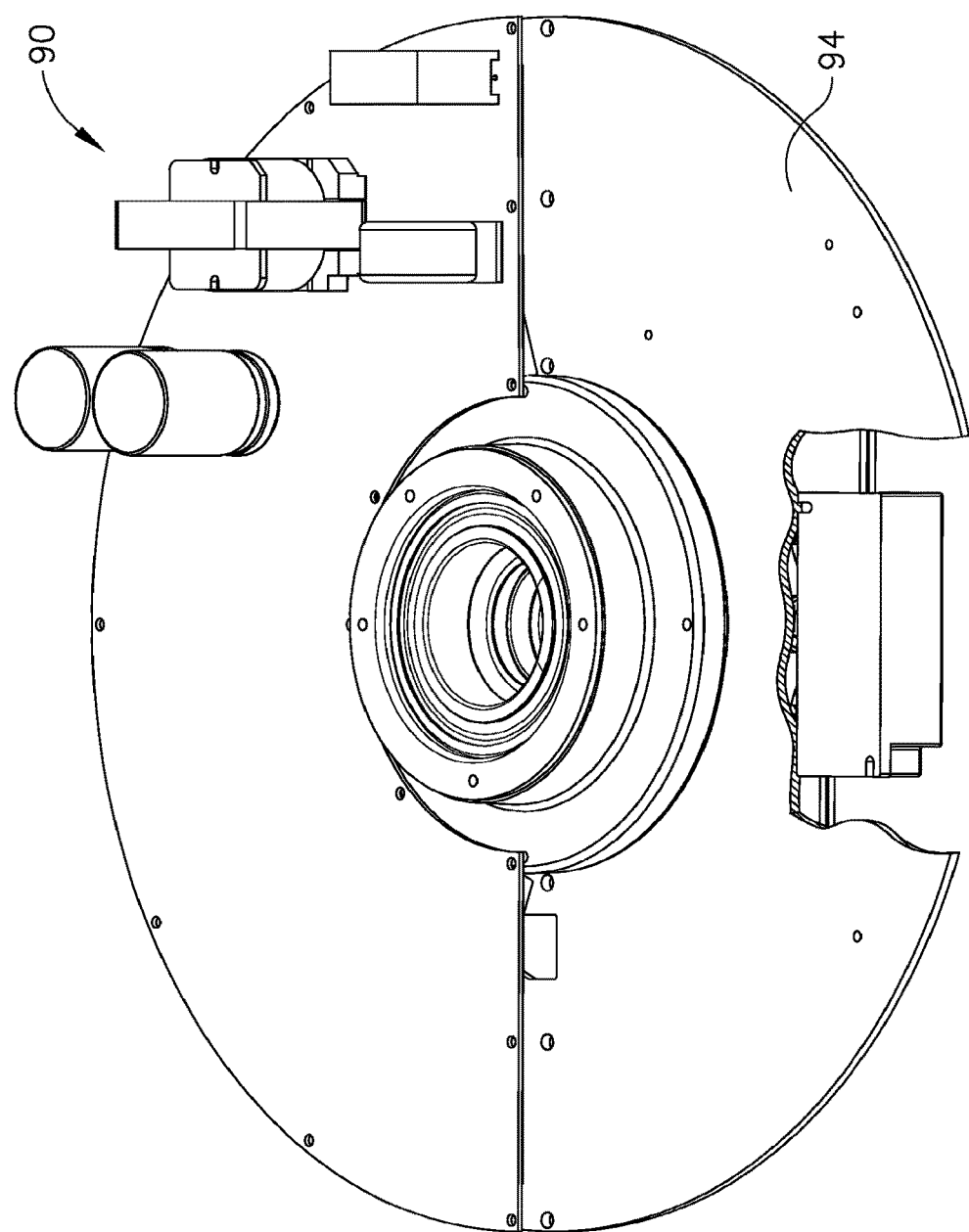
FIG. 10 depicts motor controls of the fan system of FIG. 1.

Motor (20) of the present example is operated through a control module (90), which is positioned on the bottom of fan (10) in the present example. Like motor (20) of the present example, motor control module (90) is enclosed. However, unlike motor (20) of the present example, motor control module (90) of the present example is ventilated. In some variations, motor control module (90) is located on the bottom of motor (20). In other variations, motor control module (90) is located on platform (80), which is described in greater detail below. For instance, motor control module (90) may be located on the top surface of platform (80) with one or more heat sinks (92) or other components also being mounted to platform (80). Alternatively, as shown in FIG. 10, a separate plate (94) or other feature may be provided between motor control module (90) and platform (80) for mounting motor control module (90). It will be appreciated that locating motor control module (90) the motor (20) and/or below other components may make it easier to service or maintenance motor control module (90). Alternatively, motor control module (90) may be located above motor (20) or elsewhere.

By way of example only, control module (90) may be operable to rotate motor (20), and hence, fan blades (50), from between approximately 10 RPM, inclusive (e.g., at a "low" speed setting), to approximately 82 RPM, inclusive (e.g., at a "high" speed setting), in either rotational direction. Adjustability of the rotation speed may be provided in a substantially continuous, non-incremental fashion; or in a stepped, incremental fashion. Of course, any other suitable speeds or ranges of speeds may be used. In still other variations, the speed of motor (20) is not adjustable. In the present example, when a user commands fan (10) to change its direction of rotation as it is rotating, motor control module (90) is configured to remove power to motor (20), wait until motor (20) reaches approximately 0 RPM, then switch the rotation direction. Alternatively, motor control module (90) may be configured to not wait until motor (20) reaches approximately 0 RPM or may otherwise reverse the rotation of fan blades (50) in any other suitable fashion. In either case, one or more sensors may communicate with motor control module (90) to indicate the rotation speed and/or rotation direction of fan (10).

Motor control module (90) of the present example also includes integrated power factor correction (PFC). Such PFC may be provided by an off-the-shelf power correct integrated circuit or in any other suitable fashion. The power factor controller of the present example develops a 400V DC bus to drive motor (20), though any other suitable PFC or other type of controller may be used. The use of PFC may reduce the RF noise that is generated by fan system (10), which may in turn reduce interference with other systems (e.g., RFID systems, cash registers, etc.) that are in the same facility as fan system (10).

Motor controller (90) may also include an internal AC/DC converter power supply that operates over a universal voltage input range of approximately 85 volts, inclusive, to approximately 277 volts, inclusive, though any other suitable range may be used. As another merely illustrative example, fan system (10) may operate over a voltage input range of approximately 100 volts, inclusive, to approximately 240 volts, inclusive. By way of example only, motor controller (90) may provide local control of motor (20) through analog 0-10 V or 4-20 mA current loop interfaces. As described in greater detail below, motor controller (90) may be coupled with one or more remote controls (500), and may communicate with a remote control (500) wirelessly (e.g., through wireless X-Bee serial communication, etc.) and/or through wired serial RS-232C or RS-485 interfaces, selectable through drive parameters. Drive parameters and system information may be stored in an onboard non-volatile memory device or otherwise. In addition, one or more hall effect sensors may be used to generate sinusoidal signals (e.g., without an encoder), which may in turn be used to commutate stator (24) windings. In other variations, sensors (hall or otherwise) are not used.

By way of example only, use of sine wave control of motor (20) may minimize audible noise. For instance, torque spikes that may be generated by motor (20) may be amplified by long blades (50). Sine wave control may thus reduce the overall noise level of fan system (10). A feedback system that may be used to enable generation of sine wave commutation may include a continuous feedback signal (e.g., using a resolver, etc.), digital devices (e.g., an encoder and/or hall effect sensors), and/or using any other components or techniques (e.g., sensorless commutation components and techniques, etc.), including combinations thereof. Alternatively, motor (20) may otherwise incorporate the use of sine waves to commutate stator (24) windings, or may use commutation techniques or technologies that do not include use of sine waves.

Motor control module (90) may be configured to have one or more self-protection features. For instance, and as will be described in greater detail below, control module (90) may be configured to shut down in response to or otherwise respond to any of the following: the current passing through control module (90) exceeding a threshold; line voltage falling below a threshold; an invalid hall sensor state; the temperature of control module (90) or motor (20) exceeding a threshold (e.g., sensed using a thermistor or other component); a condition detected by one or more sensors that are coupled with control module (90) (e.g., an accelerometer or heat sensor, such as is described below, etc.); and/or under other conditions. As another merely illustrative example, motor control module (90) (or some other component of fan system (10)) may provide power surge protection, such as with an inline fuse and/or a metal oxide varistor (MOV). For instance, if a voltage surge occurs, a fuse may open when an MOV shunts current in excess of the fuse rating. With respect to temperature sensing and processing, control module (90) may be in communication with various temperature sensors in various locations, such as temperature sensors that are configured to sense the temperature of stator (24), heat sink (30), one or more bearings, ambient temperature at remote control (500), ambient temperature elsewhere in the facility in which fan system (10) is located, and/or other locations.

Control module (90) may shut fan (10) down by cutting off power to motor (20) (e.g., allowing it to coast and slow to a halt by friction), actively decelerating motor (20) in a gradual fashion, abruptly stopping motor (20) via electromechanical means (e.g., brakes), utilizing dynamic braking (e.g., shorting windings in motor (20)), or in any other fashion. Furthermore, the way in which fan (10) is shut down (and/or the way in which fan (10) otherwise reacts) may vary based on the particular condition(s) detected. Once fan (10) has been shut down in response to one or more detected conditions (e.g., some condition other than the user simply activating the "off" button (510)), control module (90) may require a user to activate a "reset button" or other feature in order for fan (10) to again be operable. In addition, motor control module (90) may provide an optically isolated user input/output, cycle-by-cycle current limiting, or other features. In the event that any of the above conditions is detected, or other events are detected, motor control module (90) may communicate the same to remote control (500) and/or a remote computer as described below, via wire or wirelessly. Furthermore, some such events may be communicated while others are not (e.g., some events may be merely processed by motor control module (90) alone).

In some versions, one or more thermistors or other component(s) is/are used to detect the temperature of motor (20) as it is running. Such thermistor(s) or other component(s) may be in communication with motor control module (90). As noted above, motor control module (90) may shut fan (10) down when motor (20) temperature exceeds a certain threshold. In addition or in the alternative, motor control module (90) may simply slow fan (10) down (e.g., by throttling back on motor (20) to operate at a reduced torque level) when motor (20) temperature exceeds a certain threshold to prevent motor (20) from overheating, without necessarily stopping fan (10). For instance, a first threshold may be used for merely slowing fan (10); while a second threshold (e.g., higher than the first threshold) may be used for stopping fan (10). Permitting fan (10) to continue running may help reduce the ambient temperature external to the fan, which may in turn help reduce internal temperatures in fan (10). The motor control module (90) may continue to monitor temperatures that are internal to and/or external to fan (10), and may command motor (20) increase the rotation speed of fan (10) to remain below a temperature threshold. Suitable temperature values and ranges for such thresholds will be apparent to those of ordinary skill in the art in view of the teachings herein. Control module (90) may thus be used to compare the temperature of motor (20), a commanded rotation speed, an actual rotation speed, thermal trends (internal and/or external to fan (10)), and/or other factors to determine whether motor (20) should be slowed down or sped back up.

In addition, control module (90) may include a learning mode algorithm. By way of example only, such a mode may upon initial use "learn" a correlation between speed of motor (20) and a referenced thermal reading to enable motor (20) to adjust quickly to the optimum speed for a specific installation once the initial learning process has been completed. Other ways in which a control module (90) may "learn" and react accordingly will be apparent to those of ordinary skill in the art in view of the teachings herein.

Motor control module (90) may also be configured to store a variety of diagnostic information. For instance, motor control module (90) may store fault conditions (e.g., over-temperature, over-current, over-voltage, under-voltage, etc.), elapsed run time of the system, operating speed, or other information. Such storage may be provided by volatile memory, non-volatile memory, or otherwise. In addition, motor control module (90) may be configured to permit such information to be accessed or communicated to a remote location, such as to a remote control (500) or remote computer as described below.

It will be appreciated that, in some situations, the configuration of motor (20) and control module (90) may permit fan (10) to produce less noise than other fans that are of a relatively large size. For instance, in the present example, the configuration of motor (20) and control module (90) is such that audible noise produced by fan system (10) having blades (50) that provide a diameter between approximately 6 feet, inclusive, and approximately 24 feet, inclusive, and that rotate at approximately 82 RPM, is less than approximately 68 db or less than approximately 45 db (C scale) when measured at a distance of approximately 1 meter directly below hub (40). Alternatively, fan system (10) may operate at any other audible noise level, including but not limited to less than approximately 57 db under the same conditions listed above.

It should also be understood that control module (90) may be programmable such that control module (90) may be programmed based uniquely on a given customer's particular specifications and/or based uniquely on the environment in which fan system (10) will be installed. Such programming may include modification of control algorithms, incorporating various types of different sensors, etc. Such programming may be performed by coupling a programming device directly to control module (90) and/or by coupling a programming device to remote control (500). Programmability of control module (90) may be provided at least in part by extra pins and/or ports that are not being used by other components of fan system (10).

Various control algorithms that may be implemented through control module (90) are described below under the heading "Control Algorithms," while other control algorithms that may be implemented through control module (90) will be apparent to those of ordinary skill in the art in view of the teachings herein.

Platform Below Hub

As noted above, a platform (80) is secured to the hollow inner stationary sleeve (70) in the present example. Platform (80) therefore remains stationary during operation of fan (10). In some variations, one or more lights (100) or lighting fixtures are secured to platform (80). By way of example only, such lights (100) may be communicatively coupled with a motion sensor or other device, such as to turn off lights (100) when motion is not detected over a certain time period and/or to turn on lights (100) when motion is detected. Lights (100) may be located within a center casting at the bottom of fan (10) and/or elsewhere. Lights (100) of the present example comprise a plurality LED lights, though any other suitable types of lights may be used, including but not limited to incandescent, halogen, fluorescent (annular, compact, etc.), HBLED types, or other type of lights (100). A cover (106) is provided over lights (100) in this example. For instance, cover (106) may comprise a lens or a non-lens cover, may be formed of glass or plastic, and may be translucent or transparent. Alternatively, cover (106) may be formed of any other suitable material(s), may have any other suitable properties, or may even be omitted altogether. Similarly, lights (100) may simply be omitted altogether. In addition or in the alternative, one or more strobe lights or other lights may be included with a proximity sensor or other sensor, and may activate (e.g., along with a claxon or other alarm), when a person gets too close to fan (10) while it is operating.

In other variations, one or more speakers (e.g., as part of an overhead announcement or background music system in a store or other facility, etc.) are secured to platform (80). In still other variations, security system components (e.g., one or more mirrors, cameras, motion detectors, etc.) are secured to platform (80). Such components may be secured to platform (80) in addition to or in lieu of lights (100).

In other variations, one or more sensors are secured to platform (80). By way of example only, such sensors may include one or more heat sensors (e.g., sensors that are configured to detect a rapid rise in heat, such as those disclosed in U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein), one or more flame detectors (e.g., infrared and/or ultraviolet sensor(s)), smoke detectors, or any other sensors. One merely exemplary flame detector that may be used as a sensor is a SHARPEYE UV/IR sensor by Spectrex, Inc. of Cedar Grove, N.J. A merely exemplary heat detector device may comprise a BK-5601P heat detector device from System Sensor of St. Charles, Ill. A merely exemplary smoke detector may comprise a VESDA aspirating smoke detector with a laser detection chamber, by Xtralis, Inc. of Norwell, Mass. Other suitable fire, heat, or smoke detectors may include video and/or laser types. Of course, any other suitable sensors, for flame detection, rapid rise in heat detection, smoke detection, or otherwise, may be used. Such sensors may be secured to platform (80) in addition to or in lieu of lights (100) or other components.

Still other variations may include one or more sprinklers secured to platform (80). As noted above, one or more fluid conduits such as water pipes may be fed through stationary sleeve (70) to reach sprinklers secured to the platform (80). Such sprinklers may include conventional sprinkler heads, and be configured to spray water upon detection of flames, a rapid rise in heat, smoke, or other indication of a fire by sensors that are also secured to platform (80) or that are otherwise in communication with a component in common with the sprinklers. In addition or in the alternative, such sprinklers may be in communication with a preexisting fire detection system at the facility or location in which fan system (10) is installed. Alternatively, sprinklers may be incorporated with fan system (10) using any other suitable structures or techniques. Such sprinklers may be secured to platform (80) in addition to or in lieu of lights (100) or other components.

Of course, the foregoing are mere examples of components that may be secured to platform (80). Other components that may be secured to platform (80), including combinations of such components, will be apparent to those of ordinary skill in the art in view of the teachings herein.

In the present example, a dome (110) is mounted to the bottom of platform (80).

In the present example, dome (110) is formed of aluminum, though any other suitable material or combination of materials may be used, including but not limited to plastic, glass, and/or any other suitable material(s). In some other versions, dome (110) is substantially translucent, permitting light to pass therethrough. Alternatively, dome (110) may be transparent or have other properties. To the extent that dome (110) is translucent and/or transparent, dome (110) may also include a plurality of internal radial spines (112) to spread light from lights that are somewhere within dome (110). Dome (110) is secured relative to platform (80) by a retainer (114), though any other suitable structures or techniques may be used. A gap is provided between the upper annular edge of dome (110) and hub (40). Air may be communicated into and/or out of this gap, such as to provide ventilation of control module (90) as described above. Such ventilation may be further facilitated by openings (46) formed in hub (40) as described above. Furthermore, the gap between dome (110) and hub (40) may be complemented by a gap between the housing of motor (20) and hub (40), such that air may communicate into and/or out of either gap or both gaps to provide heat ventilation for control module (90) and motor (20), as facilitated by openings (46) formed in hub (40). Of course, dome (110) is merely exemplary, and any other suitable variations thereof may be used; or dome (110) may be omitted altogether.

Safety Mechanisms

Figure 4:
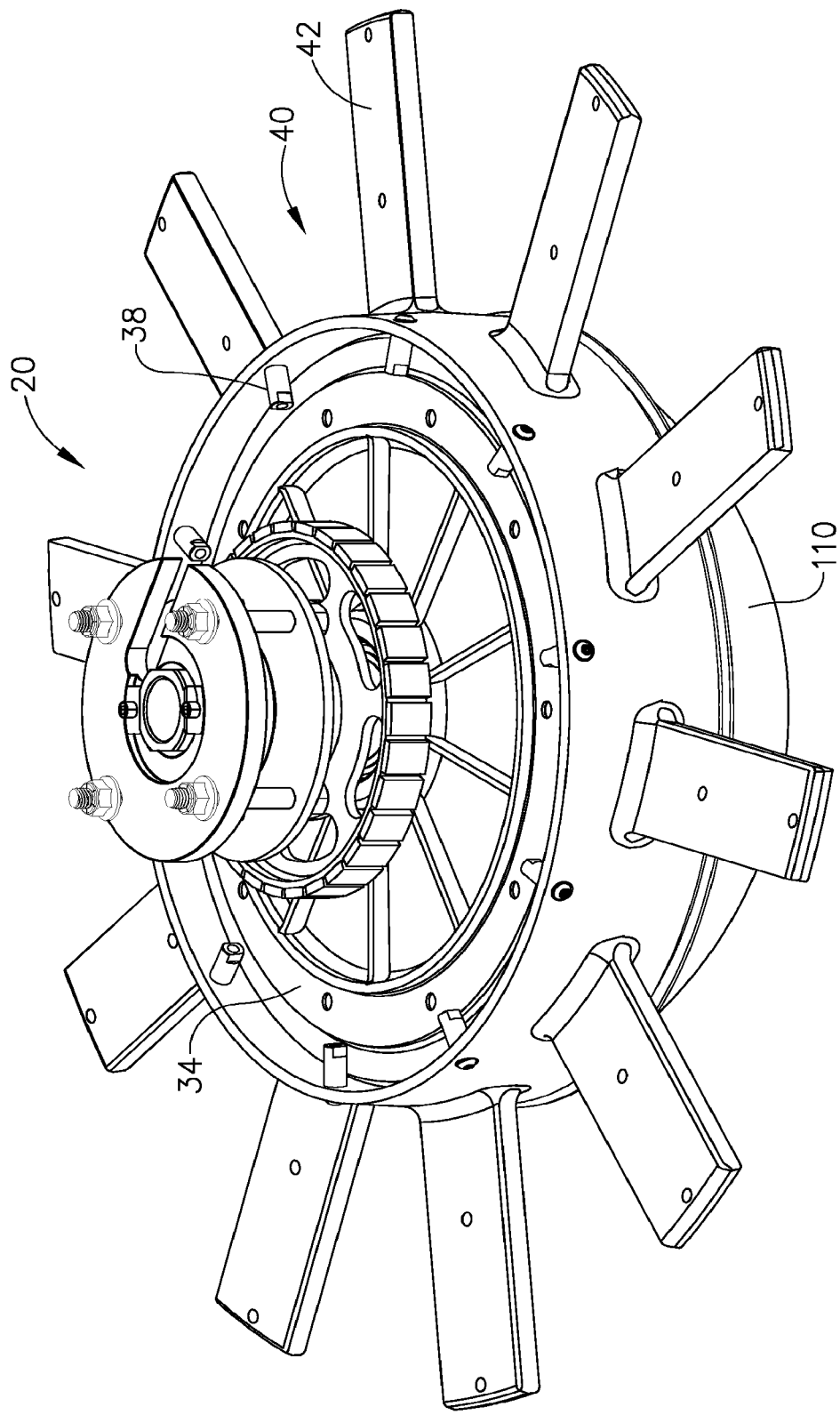
FIG. 4 depicts a perspective view of the hub assembly of FIG. 3.
Figure 5:
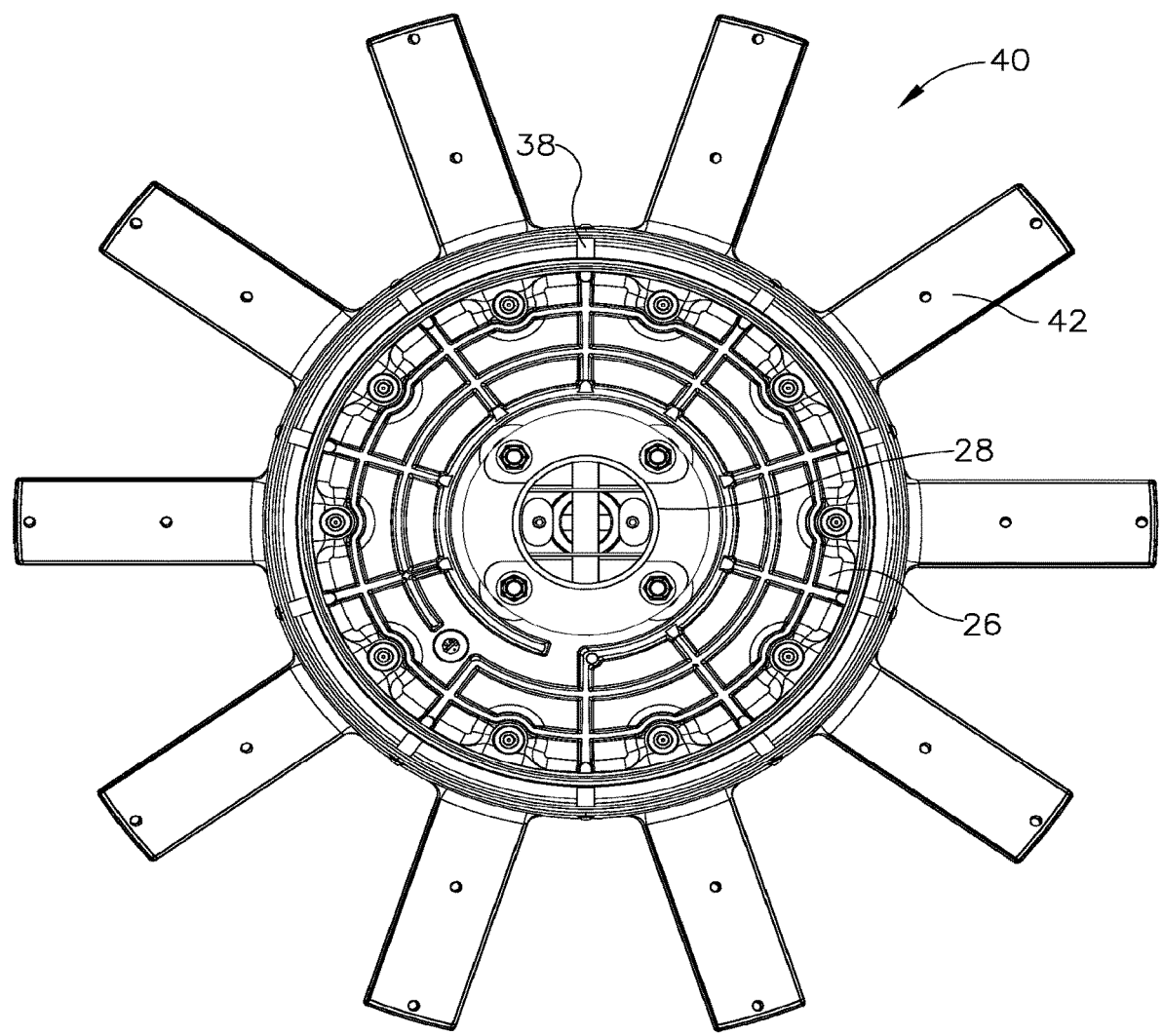
FIG. 5 depicts a top view of the hub assembly of FIG. 3.
Figure 6:
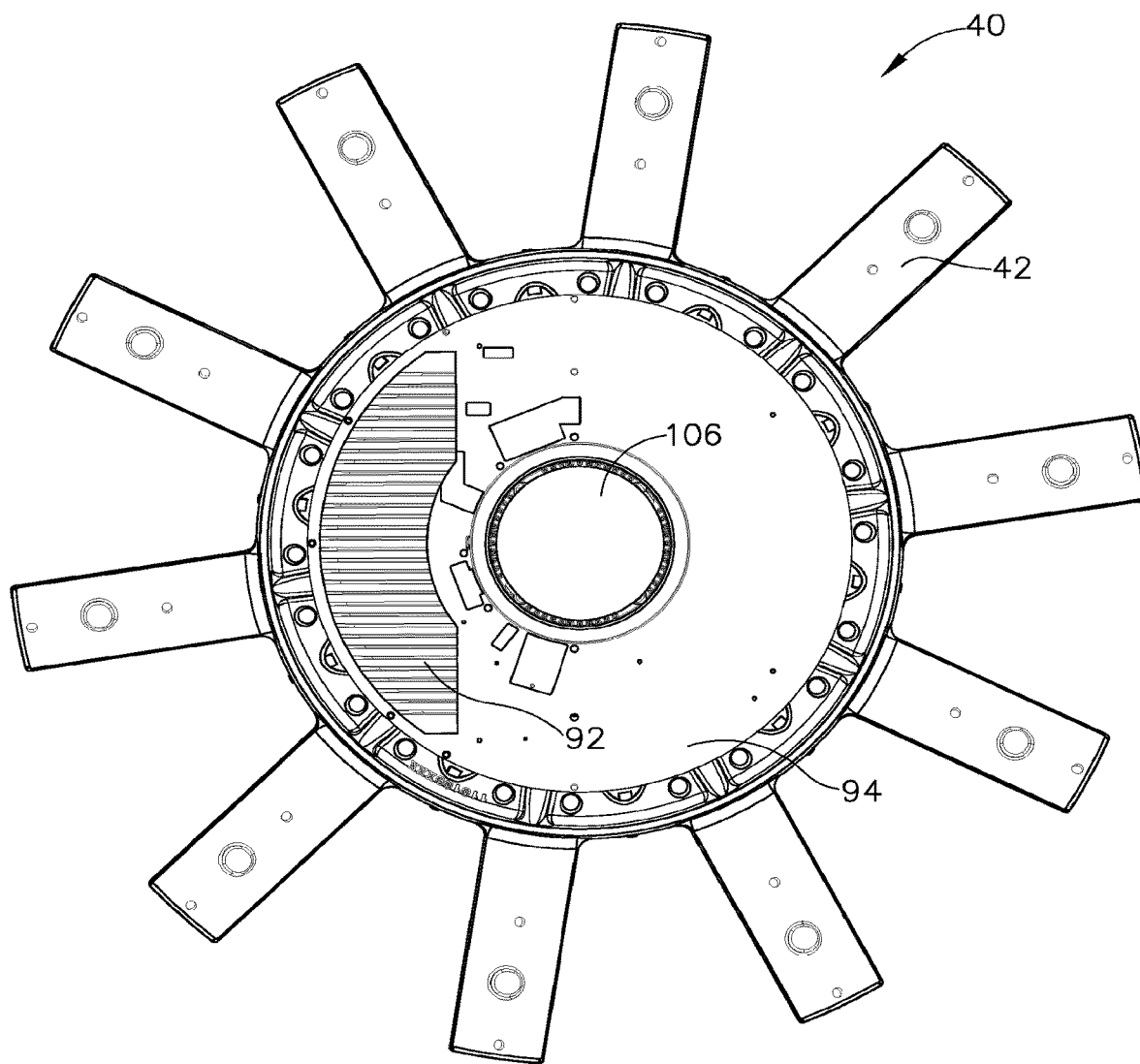
FIG. 6 depicts a bottom view of the hub assembly of FIG. 3, with lighting components removed.

As shown in FIGS. 4 and 7, the bottom of motor (20) housing is defined by a base plate (34), which is secured to heat sink (30) and bell (26) via bolts (36). The outer perimeter of base plate (34) extends radially outwardly beyond the outer perimeter of heat sink (30) in this example, providing a flange. Bearings (37) are provided between drive shaft (60) and bell (26), as well as between drive shaft (60) and base plate (34), to permit rotation of drive shaft (60) relative to bell (26), heat sink (30), and base plate (34). Bell (26), heat sink (30), and base plate (34) are all secured relative to sleeve (70) and mounting fixture (28), and thus remain stationary during operation of fan (10).

A plurality of pins (38) extend radially inwardly from the top of the hub (40), as shown in FIGS. 4 and 7, above the base plate (34). While a gap is provided between the outer circumference of the base plate (34) and the interior of the top portion (vertical rim) of hub (40) to permit rotation of hub (40) relative to base plate (34), pins (38) have a length that exceeds this gap. In particular, pins (38) are configured such that, in the event that hub (40) loses support at its interior and drops relative to base plate (34), pins (38) will engage base plate (34) to prevent hub (40) from completely falling. Pins (38) of this example thus have sufficient strength and rigidity to bear the weight of hub (40) and blades (50). In the present example, pins (38) are arranged circumferentially spaced about the perimeter of hub (40), angularly located between fan blade mounting members (42). It will be appreciated, however, that pins (38) may be arranged in any other suitable fashion. Furthermore, pins (38) may be modified, substituted, supplemented, or omitted as desired.

Figure 12:
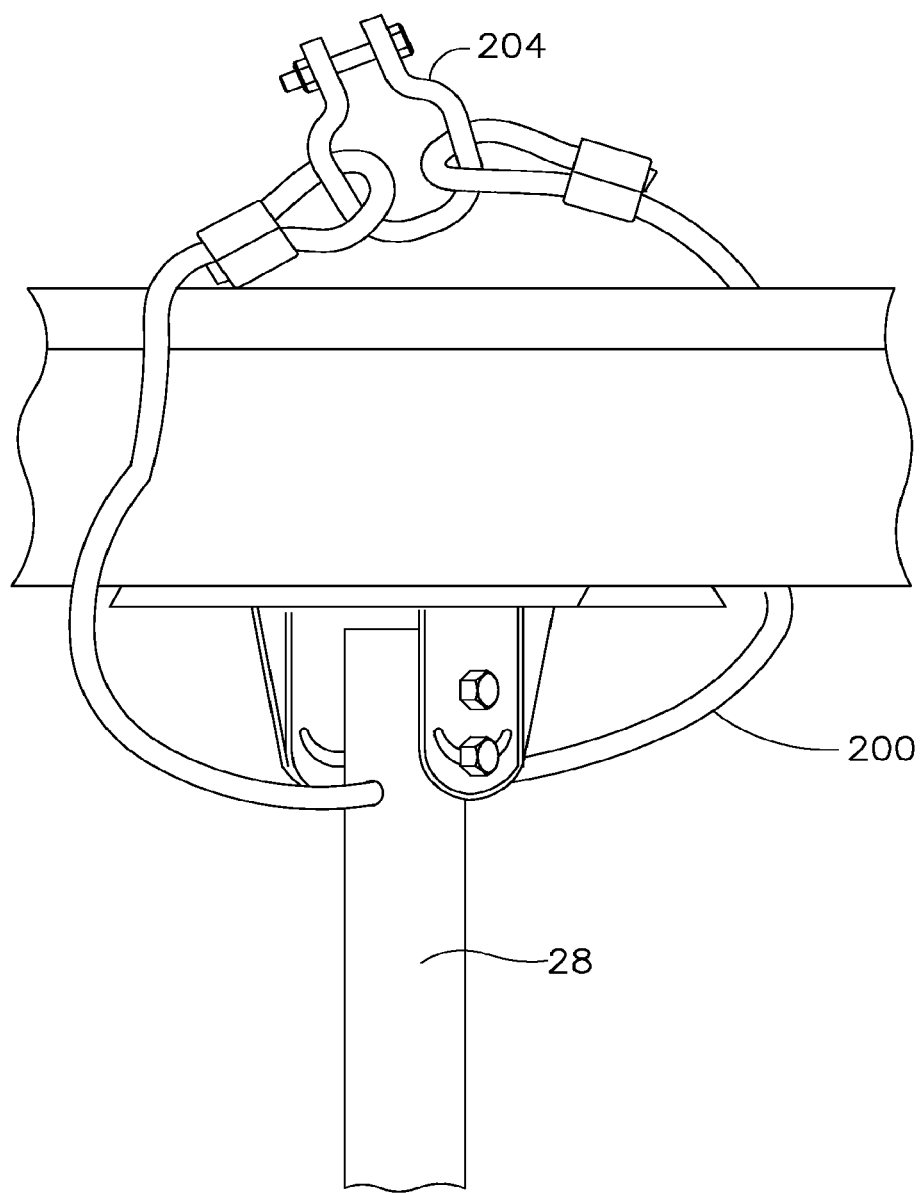
FIG. 12 depicts a plan view of a safety cable securing a portion of the fan system of FIG. 1 to a building roof structure.

Another safety mechanism that may be included in fan system (10) comprises two cables (200, 202). In this example, and as shown in FIG. 12, an upper cable (200) is secured to the ceiling (210) or some other structure associated with a roof. Hanging fixture (28) may have a transverse opening formed completely therethrough, such that cable (200) may be passed through this opening. Cable (200) may further be passed over a building roof structure (e.g., the structure that hanging fixture (28) is mounted to, such as a roof support at the ceiling (210)). The ends of cable (200) may be secured together using a fastener (204) (e.g., clevis, clamp, etc.) or using any other suitable device(s). While cable (200) does not provide any structural support to any component of fan system (10) during normal operation of fan system (10), cable (200) may have sufficient strength such that, in the event that hanging fixture (28) breaks free from the roof structure, cable (200) will prevent fan system (10) from falling to the ground.

Figure 13:
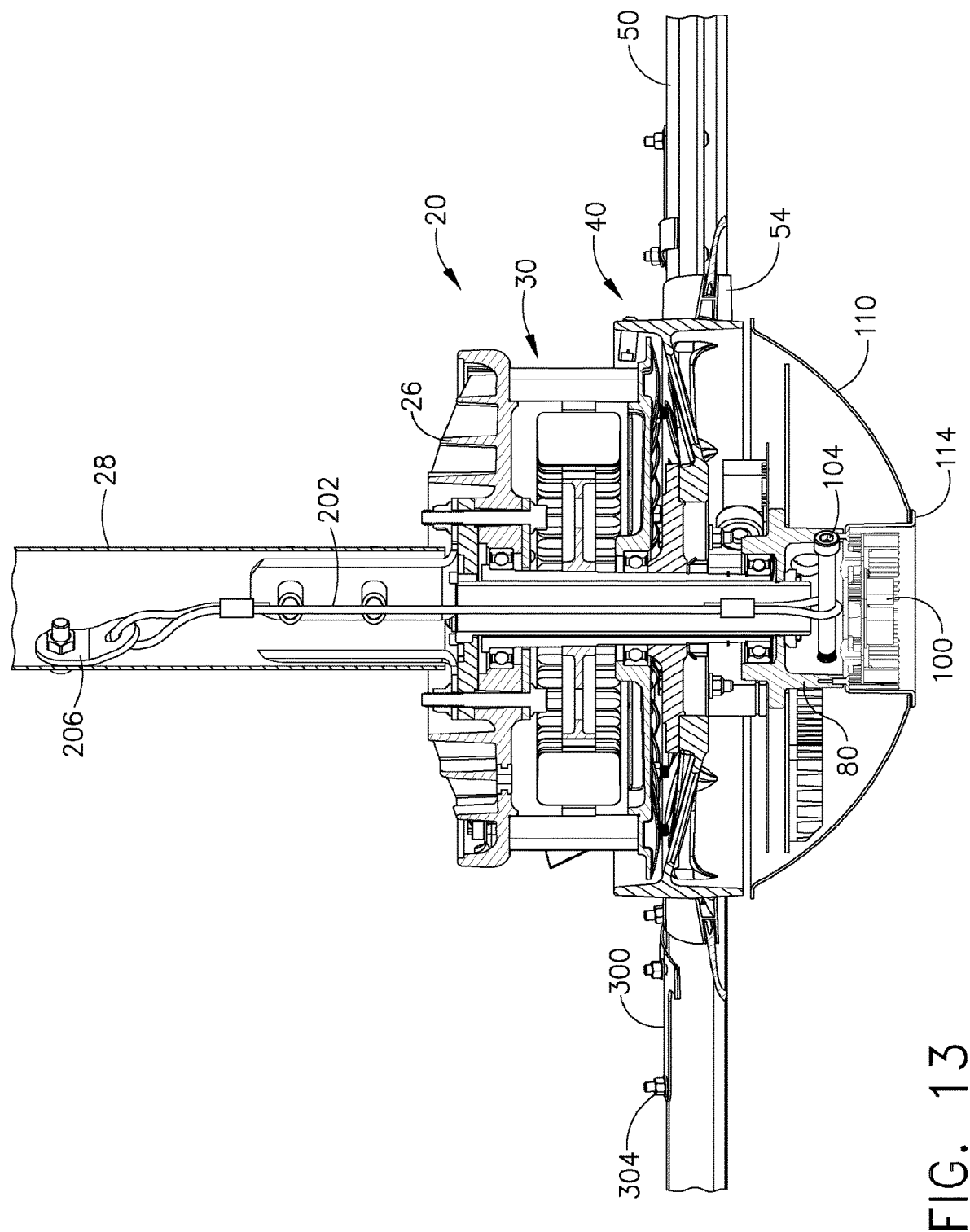
FIG. 13 depicts a partial cross-sectional view of the fan system of FIG. 1, showing a safety cable securing a portion of the fan to a hanging fixture.

As shown in FIGS. 7 and 13, lower cable (202) may be secured relative to hanging fixture (28) and platform (80). In particular, an anchor (206) is secured within the interior of hanging fixture (28). The upper end of lower cable (202) is fixedly secured to anchor (206). The lower end of lower cable (202) is secured transversely to a bolt (104), which is secured to platform (80). In the present example, the length of bolt (104) and the dimensions of the other components of fan (10) are configured such that no components of fan (10) may pass downward beyond the bolt (104). In other words, the length of bolt (104) is greater than the inner diameter of openings in components that are located above bolt (104). While the cable (202) and bolt (104) do not provide structural support to any component of fan (10) during normal operation of fan (10), cable (202) and bolt (104) are configured to bear the weight of the entire fan (10) in the event that any component of fan (10) (e.g., hub (40), motor (20), hanging fixture (28), etc.) becomes disengaged from the ceiling (210) or from any other component of fan (10). In other words, lower cable (202) may have sufficient strength such that, in the event that a portion of fan system (10) breaks free from the hanging fixture (28), cable (202) will prevent fan system (10) from falling to the ground.

While two safety cables (200, 202) are used in the present example, it should be understood that only one safety cable may be used if desired. For instance, a single safety cable may be both secured to the roof structure at the ceiling (210) and to bolt (104) at platform (80), such that the safety cable extends beyond the full length of hanging fixture (28). Alternatively, any other suitable configuration or arrangement of one or more safety cables may be used. It should also be understood that any suitable alternatives to cables (200, 202) may be used, including but not limited to rods, chains, etc. Furthermore, safety cables or similar components may be omitted altogether, if desired. Other suitable structures and ways in which safety mechanisms may be provided will be apparent to those of ordinary skill in the art in view of the teachings herein.

Torque Parameters

Motor (20) of the present example is operable to generate a broad range of torque and horsepower. By way of example only, motor (20) may provide torque selectively ranging from 0 to approximately 850 in-lbs., inclusive. Motor (20) may also provide torque selectively ranging from 0 to approximately 53 in-lbs., inclusive. Alternatively, motor (20) may provide torque among any of the following ranges, in which all of the following values are merely approximate, all of the following upper and lower boundaries are inclusive within the stated ranges, and all of the following values are in units of in-lbs.: 0 to 50; 0 to 308; 0 to 567; 0 to 825; 0 to 1,083; 0 to 1,342; 0 to 1,600; 0 to 1,859; 0 to 2,376; among other possible ranges. None of those ranges should be viewed as excluding upper limits or lower limits that are explicitly set forth. Furthermore, none of those ranges should be viewed as providing exact numbers for the upper limit and lower limit—those limits are mere approximations.

Motor (20) may drive the drive shaft (60) with a horsepower ranging from 0 to approximately 0.7328 HP, inclusive. Motor (20) may also drive the drive shaft (60) with a horsepower ranging from 0 to approximately 0.097 HP, inclusive. Alternatively, motor (20) may provide horsepower among any of the following ranges, in which all of the following values are merely approximate, all of the following upper and lower boundaries are inclusive within the stated ranges, and all of the following values are in units of HP: 0 to 0.13; 0 to 0.55; 0 to 0.93; 0 to 1.06; 0 to 1.22; 0 to 1.34; 0 to 1.40; 0 to 1.42; or 0 to 1.58; among other possible ranges. None of those ranges should be viewed as excluding upper limits or lower limits that are explicitly set forth. Furthermore, none of those ranges should be viewed as providing exact numbers for the upper limit and lower limit—those limits are mere approximations.

These above-noted ranges may be achieved with motor (20) of the present example even without a gearbox or similar device being used. However, in other embodiments, a gearbox or other device may be used. It will be appreciated that the torque values and ranges, horsepower values and ranges, and other parameters described herein and shown in the attached table are merely exemplary, and that a motor (20) may be configured to provide any other suitable values and ranges of torque and horsepower, and may operate under any other suitable parameters.

Control Algorithms

Fan system (10) of the present example may include control algorithms that are a function of certain conditions within the room or facility in which fan (10) is located. Such control algorithms may be implemented through control module (90), based at least in part on feedback obtained through various types of sensors that may be in communication with control module (90). For instance, in some variations, a first temperature sensor is provided near the ceiling of the room in which the fan is located (e.g., on platform (80) described above, on the ceiling (210) itself, etc.); while a second temperature sensor is provided near the floor of the room. Such a pair of temperature sensors may be used to determine the difference between the temperatures at or near the ceiling (210) and floor, and such a difference in temperature may be indicative of a stratification condition or undesirable temperature distribution. The temperature difference may be used to control fan (10) in response to the temperature difference. For instance, if the temperature disparity between the floor and the ceiling (210) passes a threshold, the speed of fan (10) may be automatically increased. When the temperature disparity falls back below the threshold (e.g., such that the temperature near the ceiling (210) is approximately equal to the temperature near the floor, etc.), fan (10) speed may be decreased back to its prior level, or fan (10) may be stopped. Once the temperature disparity rises again past a certain threshold, fan (10) may again be activated and controlled as described above. Various ways in which such a destratification control system may be provided (e.g., within fan system (10) of the present example) are described in PCT Patent Application Serial No. PCT/US09/32935, entitled "Automatic Control System for ceiling fan Based on Temperature Differentials," filed Feb. 3, 2009, the disclosure of which is incorporated by reference herein. Other ways in which a fan (10) may be automatically controlled based on temperature differences within a room or facility will be apparent to those of ordinary skill in the art in view of the teachings herein.

Fan system (10) of the present example may also include control algorithms that are provided as safety features. For instance, fan system (10) may include one or more accelerometers, heat sensors, smoke detectors, anemometers, and/or other components that are configured to sense a mechanical obstruction to the rotating blades (50), an imbalance condition (e.g., fan (10) is wobbling), a fire (e.g., as a rapid rise in temperature and/or smoke), high winds (e.g., when fan (10) is located outdoors), and/or other conditions. Such components may include off-the-shelf components and/or may have adjustable sensitivity. For instance, in some versions, an off-the-shelf heat sensor is mounted to platform (80) to detect a rapid rise in temperature. Alternatively, an off-the-shelf smoke detector may be coupled with platform (80). An exemplary use of such a heat sensors and smoke detectors is disclosed in U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein. Additional sensors whose feedback may be factored into a control algorithm may include one or more flame detectors (e.g., infrared and/or ultraviolet sensor(s)), smoke detectors, or any other sensors. One merely exemplary flame detector that may be used as a sensor is a SHARPEYE UV/IR sensor by Spectrex, Inc. of Cedar Grove, N.J. A merely exemplary heat detector device may comprise a BK-5601P heat detector device from System Sensor of St. Charles, Ill. A merely exemplary smoke detector may comprise a VESDA aspirating smoke detector with a laser detection chamber, by Xtralis, Inc. of Norwell, Mass. Of course, any other suitable sensors, for flame detection, rapid rise in heat detection, smoke detection, or other type(s) of detection, may be used.

Such components may be in communication with control module (90), which may be configured to bring fan (10) to a controlled safety stop (or provide some other type of reaction) in response to a signal from one or more accelerometers and/or other components that indicates a safety condition such as a mechanical obstruction. For instance, control module (90) may bring fan (10) to a stop in response to detection of conditions indicative of a fire in the facility in which fan (10) is installed, conditions indicative of blades (50) impacting an object, conditions indicative of an imbalance in fan (10), etc. As noted above, the safety stop may be gradual or abrupt, which may vary based on the sensed condition or may be the same for all safety condition. Various ways in which a fan (e.g., within fan system (10) of the present example) may be controlled in response to a rapid rise in heat, the presence of smoke, a fan blade (50) striking an obstruction, or in response to other conditions are described in U.S. Non-Provisional patent application Ser. No. 12/249,086, entitled "Ceiling Fan with Concentric Stationary Tube and Power-Down Features," filed Oct. 10, 2008, the disclosure of which is incorporated by reference herein. By way of example only, control module (90) may react to such conditions by reducing the rotation speed of motor (20) to a reduced non-zero level, allow motor (20) to "coast" to a stop, cause active braking of motor (20) or hub (40), etc. As another merely illustrative example, a software-based (or otherwise-based) "notch filter" may be implemented to prevent fan (10) from operating at a speed that creates undesirable audible effects due to certain dynamics associated with the installation. Other ways in which a fan (10) may be automatically controlled based on a variety of conditions (e.g., blade obstruction, rapid heat rise, smoke, etc.) will be apparent to those of ordinary skill in the art in view of the teachings herein.

Similarly, fan system (10) of the present example may be controlled to prevent undesirable oscillation or wobbling of fan (10). For instance, various ways in which a fan (e.g., within fan system (10) of the present example) may be controlled to prevent oscillation or wobbling are disclosed in U.S. Non-Provisional patent application Ser. No. 12/336,090, entitled "Automatic Control System to Minimize Oscillation in Ceiling Fans," filed Dec. 16, 2008, the disclosure of which is incorporated by reference herein. Other ways in which a fan (10) may be automatically controlled to prevent a variety of conditions (e.g., undesirable oscillation or wobbling, etc.) will be apparent to those of ordinary skill in the art in view of the teachings herein.

It will also be appreciated that the same sensors may be used to detect different conditions. For instance, an accelerometer may be used to detect both a mechanical obstruction or impact by a fan blade (50) and an imbalance of fan (10). By way of example only, thresholds and/or timers may be used to distinguish between an impact and an imbalance. Similarly, the same temperature sensor that is used to detect heat near the ceiling for destratification purposes may also be used to detect a fire for purposes of shutting fan (10) down. Other ways in which sensors or other components may be used to serve multiple purposes will be apparent to those of ordinary skill in the art in view of the teachings herein.

In some contexts, fan system (10) may be positioned near one or more sprinkler heads mounted to the ceiling of a building, such as may be found in some ESFR (Early Suppression, Fast Response) systems. In some such instances, blades (50) of fan (10) may have sufficient length such that they may pass under such sprinkler heads, such that one or more blades (50) may present an obstacle to water being sprayed from a sprinkler head. It may (or may not) be desirable in some instances to prevent fan (10) from stopping in such a way that a blade (50) is positioned directly under a sprinkler head or sufficiently under a sprinkler head to adversely affect the flow of water from the sprinkler head. For instance, this may (or may not) be of particular concern where fan (10) is brought to an "emergency stop" upon detection of a rapid rise in heat, detection of a flame, detection of smoke, or detection of any other indication of a fire. Of course, it may also be of concern when fan (10) is stopped in the absence of an emergency. Alternatively, stopping a fan (10) such that one or more blades (50) are located at least partially under a sprinkler head may pose no issues or problems whatsoever. In other words, the location of a fan (10) and its blades (50) may have no adverse effects whatsoever on operation of an ESFR system, even if one or more of the blades (50) is within the path of water being sprayed by an overhead sprinkler.

There are a variety of ways in which a fan (10) may be brought to a stop in a manner such that a blade (50) is not undesirably positioned at least partially under a sprinkler head. For instance, an encoder wheel and sensor or other device(s) may be used to sense the rotational position of rotor (22), which may be indicative of the rotational position of blades (50). A controller that is in communication with such a position sensor may also be configured to receive instructions indicating one or more rotational positions at which fan (10) should stop and/or one or more rotational positions at which fan (10) should not stop. Such instructions may be programmed into the controller upon installation of fan (10) or at any other suitable time. For instance, upon installation of fan (10), an installer may manually rotate blades (50) to a position at which none of them are located under a sprinkler. The installer may then program the controller to record that rotational position. The controller may then ensure that when fan (10) is stopped (e.g., only in an emergency situation or any time the fan is stopped, etc.), fan (10) will always stop at that programmed rotational position. This may be carried out using electromagnetic braking, mechanical braking, or any other suitable techniques. Still other ways in which a fan (10) may be brought to a stop in a manner such that a blade (50) is not undesirably positioned at least partially under a sprinkler head will be apparent to those of ordinary skill in the art in view of the teachings herein.

Remote Control

Fan system (10) of the present example includes a remote control (500), a merely illustrative example of which is illustrated in FIG. 11. In particular, remote control (500) of the present example is a wall mounted unit that is operable to communicate with motor control module (90) wirelessly. For instance, remote control (500) may be configured to communicate via RF, such as using Bluetooth, ZigBee, or any other suitable protocol; or using ultrawideband, infrared, or any other suitable modality. Alternatively, remote control (500) may communicate with motor control module (90) via one or more wires or otherwise.

By way of example only, remote control (500) may include a display screen (502) and a set of buttons (504, 506, 508, 510, 512). Display screen (502) may include an LCD display or any other suitable type of display. By way of example only, remote control (500) may be similar to (e.g., have any desired features in common with) the remote control described in U.S. Patent Application Pub. No. 2005/0253731, entitled "Movable Barrier Operator System Display Method and Apparatus," published Nov. 17, 2005, the disclosure of which is incorporated by reference herein. Buttons (504, 506, 508, 510, 512) may be provided under a membrane, and may comprise thin film switches, capacitive switches, or be provided in any other suitable form. In other versions, display screen (502) and buttons (504, 506, 508, 510, 512) are combined in the form of a touch-screen. In the present example, buttons include a "left arrow" button (504), a "right arrow" button (506), a "next menu" button (508), a "on/off" button (510), and a "light" button (512). Of course, any of these buttons (504, 506, 508, 510, 512) may be varied or omitted, and any other suitable buttons may be used.

Buttons (504, 506, 508, 510, 512) on the remote control (500) may be operable to turn the fan (10) on or off, control the direction of fan blade (50) rotation (e.g., clockwise or counterclockwise), adjust the rotation speed of the fan (10), and to activate lights (100) and/or other auxiliary components (e.g., thermal sensors, humidity sensors, anemometers, external lights, etc.). By way of example only, "on/off" button (510) may be used to turn the fan (10) on or off. A "light" button (512) may be used to turn lights (100) on or off. Arrow buttons (504, 506) may be used to adjust the rotation speed of fan (10). In particular, "right arrow" button (506) may be used to increase the rotation speed of fan (10) when fan (10) is rotating in a first direction; and be used to decrease the rotation speed of fan (10) when fan (10) is rotating in a second direction. Conversely, "left arrow" button (504) may be used to decrease the rotation speed of fan (10) when fan (10) is rotating in the first direction; and be used to increase the rotation speed of fan (10) when fan (10) is rotating in the second direction. In some versions, however, "right arrow" button (506) is used to increase the rotation speed of fan (10) regardless of the direction of rotation; while "left arrow" button (504) is used to decrease the rotation speed of fan (10) regardless of the direction of rotation.

A "reset" button (not shown) may also be included on remote control (500), such as to reset and start fan (10) when a fault condition has been addressed. To the extent that a "reset" button is included, it may be located such that it is somewhat hidden and/or relatively difficult to activate, such as to prevent inadvertent activation of the "reset" button during normal operation of fan (10). Alternatively, the functional equivalent of a "reset" button may be provided by activation of one or more other buttons (504, 506, 508, 510, 512) in a certain combination and/or pattern, and/or for a certain duration of time.

Various exemplary information that may be indicated by display screen (502), and associated functions that may be effected by buttons (504, 506, 508, 510, 512), are shown in FIG. 11. For instance, an icon (520) representing a fan (or any other indication) may be shown on display screen (502) to indicate that blades (50) are rotating (e.g., motor (20) is on and rotating blades (50)). Icon (520) may be illuminated when blades (50) are rotating, and may be dark when blades (50) are not rotating (e.g., motor (20) is off). As another example, icon (520) may be green when blades (50) are rotating, and may be red when blades (50) are not rotating. As yet another example, icon (520) may rotate when blades (50) are rotating, and may remain stationary when blades (50) are not rotating. Alternatively, icon (520) may be used to indicate whether blades (50) are rotating in any other suitable fashion. Of course, as with other features described herein, icon (520) may be varied or omitted if desired.

An icon (522) representing a light bulb (or any other indication) may be shown on display screen (502) to indicate whether lights (100) are on. Icon (522) may be illuminated when lights (100) are on, and may be dark when lights (100) are off. As another example, icon (522) may be green when lights (100) are on, and may be red when lights (100) are off. Alternatively, icon (522) may be used to indicate whether lights (100) are on or off in any other suitable fashion. Of course, as with other features described herein, icon (522) may be varied or omitted if desired.

An icon (526) representing a right arrow (526) may indicate that fan (10) is rotating in a direction to provide downward airflow. An icon (524) representing a left arrow (524) may indicate that fan is rotating in a direction to provide upward airflow. Of course, as with other features described herein, icons (524, 526) may be varied or omitted if desired.

A percentage indicator (530) may indicate the rotation speed of fan (10) as a percentage of its maximum rotation speed. Of course, a variety of other indicators may be used to indicate the rotation speed of fan (10), including but not limited to a representation of a bar, dial, etc.

Display screen (502) of remote control (500) of the present example may also be configured to display status and/or error information to the user. For instance, display field (528) of display screen (502) may indicate whether remote control (500) is in communication with control module (90) wirelessly, via wire, or not in communication with control module (90). Such an indication may be provided briefly upon startup of fan system (10) (e.g., for a few seconds after a user first activates "on" button (510)). To the extent that remote control (500) controls more than one fan (10), display field (528) may show how many fans (10) remote control (500) is commanding, and may even provide identification of which particular fans (10) remote control (500) is commanding. For instance, specific fans (10) may be assigned specific fan numbers, and display field (528) may cycle through or scroll, etc., the fan numbers associated with the fans (10) that remote control (500) is commanding. As another merely illustrative example, and as will be described in greater detail below, the user may activate "next" button (508) to arrive at a menu permitting the user to select one or more fans (10) from various available fans (10), such as by using arrow buttons (504, 506) when the user as at the fan selection menu. Display field (528) may present information using bitmaps or other types of image files, using alphanumeric representations, and/or using any other type(s) of representations, including combinations thereof.

In the present example, the "next menu" button (508) may be used to cycle through various menus on remote control (500). The display field (528) of display (502) may provide some indication as to which menu is currently being accessed, and may also display icons and/or other information associated with the particular menu that is currently being accessed. For instance, after the user initially turns on fan system (10), display (502) may show a general control screen. The user may then activate "next menu" button (508) to reach an "active fan" menu on display (502). The phrase "active fan" may appear in display field (528) when the "active fan" menu is reached. Alternatively, any other suitable indication may be provided.

The "active fan" menu may permit the user to select which particular fan or fans (10) is or are to be controlled by remote control (500). By way of example only, fans (10) may be assigned identification numbers or other forms of identification, and the user may cycle through these identification numbers by pressing one of the arrow buttons (504, 506) while the "active fan" menu is showing, until the user arrives at an identifier for a fan (10) that the user would like to control. In some versions, the user may select several fans (10) in this manner without leaving the "active fan" menu, then activate "next menu" button (508) until the user reaches the general control screen, and the user may then control all of the selected fans (10) in a synchronous manner. In other versions, the user selects a first fan (10) through the "active fan" menu, activates "next menu" button (508) until the user reaches the general control screen, then controls the first selected fan (10) through the general control screen, then activates "next menu" button (508) to again reach the "active fan" menu, then selects a second fan (10) through the "active fan" menu, and so on. The first fan (10) may continue to run as initially commanded while a control command is entered for the second fan (10). A single remote control (500) may thus be used to control several fans (10) in a synchronized fashion or independently of one another.

By actuating "next menu" button (508) again, the user may advance to another menu. For instance, a "direction" menu may permit a user to select the direction of fan (10) rotation, such as by using "left arrow" button (504) and "right arrow" button (506) once the "direction" menu has been reached. The word "direction" may appear in display field (528) when the "direction" menu is reached. Alternatively, any other suitable indication may be provided. "Left arrow" icon (524) and "right arrow" icon (526) may be used to indicate the direction in which fan (10) is rotating or will be rotating. The user may switch the direction of rotation by activating buttons (504, 506) when the "direction" menu is being displayed by display (502). In the present example, fan system (10) provides counterclockwise rotation of blades (50) (as viewed from the floor looking up toward fan (10) and the ceiling (210)) by default, though clockwise rotation may be provided by default if desired. In particular, hub (40) and blades (50) are configured to provide downward airflow when hub (40) and blades (50) are rotated counterclockwise. As noted above, when a user changes fan (10) rotation direction through "direction" menu, motor (20) may coast to a stop, then reverse its rotation and increase in speed until it reaches a set rotation speed. Of course, if fan (10) has not yet started to rotate when the user selects a rotation direction through "direction" menu, fan (10) may rotate in the selected direction as soon as the user initiates rotation.

By activating "next menu" button (508) yet again, the user may advance to yet another menu. For instance, an "Aux" menu may permit a user to toggle auxiliary output on or off, such as by using "left arrow" button (504) and "right arrow" button (506) once the "Aux" menu has been reached. A visual indication in display field (528) may indicate whether auxiliary output is on or off when the "Aux: menu is being presented.

Yet another additional menu that may be reached by activating "next menu" button (508) a sufficient number of times may permit a user to reset an auxiliary fault indication, such as by using "right arrow" button (506) once the auxiliary fault menu has been reached. Still other alternative menus that may be shown in display screen (502) will be apparent to those of ordinary skill in the art in view of the teachings herein. In other versions, display screen (502) merely shows a single menu or set of options.

Display field (528) may also be operable to indicate whether fan (10) is operating properly or whether a fault condition is present (e.g., by providing an error code to indicate the nature of the fault, such as motor fault, controller fault, temperature fault, imbalance, etc.). When a fault is detected, display screen (502) may indicate such fault (e.g., by automatically presenting a fault indication screen), and remote control (500) may be inoperable to control at least part of fan system (10), until such fault is successfully addressed. For instance, when a fault is detected, arrow buttons (504, 506) may be inoperable to cause fan blades (50) to rotate until the fault is successfully addressed. Similarly, "next" button (508) may be inoperable to cycle away from a fault indication screen until the fault is successfully addressed. In other words, when a fault is detected, display (502) may automatically default to a fault screen until the fault is addressed by the operator or maintenance personnel. Alternatively, display (502) may show an icon (e.g., an exclamation point in a triangle) on the main control screen when a fault is detected, which will indicate to the user that they should tap "next" button (508) to cycle the screen on display (502) to a fault screen. Of course, remote control (500) could also provide a variety of other types of indications to notify the user of a fault condition (e.g., flashing light, beeping, etc.).

By way of example only, display field (528) may display any or all of the following messages in response to detection of one or more faults, among other types of messages: "imbalance detected—correct fault, then reset system;" "data link lost—check for power at drive—check wiring connections;" "motor fault—thermal—service required;" "motor fault—current limit—service required" (e.g., when motor (20) current exceeds approximately 10 amps); "motor fault—feedback—service required;" "motor fault—stall—service required" (e.g., when current in motor (20) is above minimum and it fails to rotate within approximately 20 seconds of commanding it to run); "motor fault—low AC line—service required;" "motor fault—PFC-service required;" "drive fault—thermal—service required;" "drive fault—power stage—service required;" "drive fault—voltage—service required." Alternatively, remote control (500) may notify the user of faults using any suitable text, color(s), graphics, sound(s), etc., including combinations thereof. To the extent that a single remote control (500) is in communication with a plurality of fans (10), display (502) may also indicate which particular fan (10) a given fault is associated with. Other faults that a user may be notified of, and various other ways in which a user may be notified of faults, will be apparent to those of ordinary skill in the art in view of the teachings herein.

In some versions, fan system (10) provides a two-tiered reaction in the event of a thermal fault in motor (20). As noted above, thermal faults in motor (20) may be detected using a thermistor or any other suitable component(s). When the temperature of motor (20) exceeds a first threshold, the rotation speed of motor (20) may be reduced and the temperature monitored. If the temperature of motor (20) falls back below the first threshold, or falls below some other threshold, the speed of motor (20) may be increased back to its previous speed. However, if the temperature of motor (20) continues to rise, passing a second (higher) threshold, even with the speed of motor (20) being reduced, power to motor (20) may be stopped such that fan system (10) will be at least partially disabled until the temperature of motor (20) drops to an acceptable level. Such a two-tiered reaction may also be provided in situations where the temperature of control module (90) exceeds a first and second threshold. Of course, thermal faults may be addressed in a variety of other ways if desired. For instance, a single type of response may be provided in response to a fault, such as automatic disablement of fan system (10) in the event that an impact of blade (50) or imbalance in fan system (10) is detected and/or in the event that the 400V bus generated by the PFC has deviated above or below an acceptable range. Furthermore, automatic reactions to certain faults may have a temporal limit. For instance, if AC line voltage drops below a threshold, fan system (10) may be disabled until the AC line voltage rises again to an acceptable level, whereupon fan system (10) may automatically resume normal operation. Still other ways in which control module (90) and/or other components of fan system (10) may react upon detection of one or more faults will be apparent to those of ordinary skill in the art in view of the teachings herein.

In some versions, remote control (500) may also be used to reset or clear at least some faults, such as using arrow buttons (504, 506) when an appropriate menu is being presented by display (502). Remote control (500) may communicate with one or more sensors, motor control module (90), and/or any other suitable component(s) to determine whether the fault at issue has been appropriately addressed. If the fault at issue has not been appropriately addressed yet, display screen (502) may so indicate (e.g., by either not responding to a fault clear attempt or by explicitly indicating that the fault has not been appropriately addressed, etc.). Furthermore, some faults (e.g., fan imbalance, etc.) may require the operator to access a reset button on or near motor control module (90) before fan (10) may become operational once again, to ensure proper inspection of fan system (10); while other faults may be reset at remote control (500). Display screen (502) may show whether faults have been successfully addressed and cleared, using any suitable indication(s) such as text, color, graphics, sound, etc., including combinations thereof.

In addition to or in lieu of the information described above as being shown on display screen (502), display field (528) of display screen (502) may show a CFM meter (e.g., showing the cubic feet per minute of air being moved by fan (10)); a velocity meter (e.g., indicating the velocity of air being moved by fan (10)); day-date-time, temperature (e.g., room temperature, upper and lower air temperature, outside temperature, etc.); humidity; power consumption per hour or an energy ticker, etc.; system health status; a screen saver logo (e.g., even permitting the user to select a screen saver from among several options); and/or any other information or features that are desired to incorporate into display screen (502). Alternatively, a remote control (500) may lack a display screen (502) altogether.

In operation, when a user activates "on/off" button (510), fan system (10) may be turned on, and motor (20) may rotate fan blades (50) to whatever speed they were rotating at when fan system (10) was last used. Alternatively, fan system (10) may simply turn on when a user activates "on/off" button (510), such that motor (20) does not rotate fan blades (50) until the user activates "right arrow" button (506). At that time, motor (20) may rotate fan blades (50) to whatever speed they were rotating at when fan system (10) was last used; or may simply start rotating fan blades (50) at some predefined initial rotation speed, etc. (e.g., at approximately 12% of the maximum rotation speed). To the extent that a previously used rotation speed is used at the initiation of blade (50) rotation, data indicating the previously used rotation speed may be stored in a memory residing in remote control (500), residing in motor control module (90), and/or residing elsewhere.

As noted above, "right arrow" button (506) may be used to increase the rotation speed of fan (10); while "left arrow" button (504) may be used to decrease the rotation speed of fan (10). In some versions, holding "right arrow" button (506) down will cause the rotation speed of fan (10) to ramp up substantially continuously; while tapping "right arrow" button (506) may cause rotation speed of fan (10) to step up by approximately 1 RPM (or any other suitable increment) each time "right arrow" button (506) is tapped. Similarly, remote control (500) may be configured such that holding "left arrow" button (504) down will cause the rotation speed of fan (10) to ramp down substantially continuously; while tapping "left arrow" button (504) may cause rotation speed of fan (10) to step down by approximately 1 RPM (or any other suitable increment) each time "left arrow" button (504) is tapped.

Remote control (500) may also include a battery or other internal power source and/or a clock. For instance, a battery may provide power to a real time clock in remote control (500). A battery may also provide power to a volatile memory and/or other components in remote control (500). While remote control (500) may also be powered by a pre-existing power source at the facility in which fan system (10) is installed, and may rely solely or at least partially on such a pre-existing power source, a battery may provide backup power to a clock and/or other components in remote control (500) in the event that the main power to the facility is lost. To the extent that a battery is incorporated into remote control (500), display (502) may provide one or more messages when the battery is low. For instance, display (502) may show a battery icon or some other icon when the battery is low. Alternatively, display (502) may provide a low battery indication using one or more of the other icons (520, 522, 524, 526), such as by toggling back and forth between illuminating and darkening icons (520, 522).

Remote control (500), including any software within remote control (500), may also have any, all, or none of the following aspects: Windows CE operating system; multi-dialog GUI; self-reboot; password schema to prevent certain software from being uninstalled, modified, or copied (e.g., only permitting administrator, but not a user, to engage in such operations); password schema to prevent system settings from being deleted or modified (e.g., only permitting administrator, but not a user, to engage in such operations); ability to control multiple fans (10) individually and/or contemporaneously from a single remote control (500); 24/7 fan operation schedule; record error log; provide maintenance reminders (e.g., lamp life, etc.); FM radio, satellite radio, internet radio, etc. (e.g., providing weather information for display on a display screen and/or to automatically influence fan operation); atomic clock; audible start signal prior to operation; ability to perform cooling comfort, cubic feet per minute (CFM), velocity calculations (e.g., for automatically adjusting fan speed); ability to interface with an HVAC system (e.g., a TRACE system, etc.); remote access to download data for study or troubleshooting purposes; ability to control fan (10) wirelessly; ability to update firmware wirelessly; ability to download data wirelessly (e.g., for study or troubleshooting purposes, etc.); sensors (e.g., for use in cooling comfort, temperature, humidity calculations, etc.); USB port; RJ45 port; and/or wireless card/chip. Various ways in which such features may be incorporated into remote control (500) and any other associated components of fan system (10) will be apparent to those of ordinary skill in the art in view of the teachings herein. Furthermore, other suitable features that a remote control (500) may include will be apparent to those of ordinary skill in the art in view of the teachings herein.

In some variations, each fan (10) has a corresponding remote control (500). In other variations, where a plurality of fans (10) are provided (e.g., within the same room, facility, and/or geographic location, etc.), a single remote control (500) may be used to control a plurality of fans (10). Such control may be "across the board" (e.g., all fans (10) are simultaneously subject to the same commands entered via a single remote control (500)). Alternatively, a single remote control (500) may be operable to selectively control individual fans (10) within a plurality. For instance, each fan (10) within a plurality of fans (10) may be identifiable and selectable through a single display screen (502), and a single remote control (500) may be used to control such fans (10) individually and/or in groups. As an example of fan (10) group control, fans (10) may be grouped per location (e.g., per fans (10) being in the same room within a facility when the facility has various rooms with fans (10), per fans (10) being within the same building where a facility has various buildings with fans (10) at common geographic location, per fans (10) being within the same facility when there are several facilities at different geographic locations, etc., including various selectable combinations and permutations of such groupings). Fans (10) may also be grouped based on a user's ad hoc assignment of fans (10) to a control group. Of course, a remote control (500) may be operable in a plurality of modes, such as a mode permitting "across the board" control of a plurality of fans (10), a separate mode for controlling single fans (10) individually, a separate mode for identifying fan (10) groups, a separate mode for controlling fans (10) in groups, etc.

Remote control (500) may also include a port that may be used to couple remote control (500) with some other device, such as for using another device to transmit software, data (e.g., diagnostic or operational data), or commands to remote control (500) via the port. Such transmitted software, data, or commands may be stored by and/or used by remote control (500). In addition or in the alternative, remote control (500) may relay at least a portion of such transmitted software, data, or commands to motor control module (90). As yet another variation, motor control module (90) may include such a port. Where motor control module (90) includes such a port, such a port may also be included in remote control (500) or may be omitted from remote control (500). In still another variation, a port in remote control (500) may be used to transmit software, data, and/or commands to a desktop or laptop computer, among other devices.

In addition or in the alternative, a port in remote control (500) and/or in control module (90) may be used to couple fan (10) with a centralized HVAC control system that is within the facility in which fan (10) is installed (e.g., a pre-existing HVAC control system that was installed before fan (10)). In other words, remote control (500) and/or control module (90) (and/or any other component of fan system (10)) may interface with a facility's centralized HVAC control system, such that unidirectional or bi-directional communication may be provided between fan system (10) and the HVAC control system. Software, data, or commands may thus be communicated one way or both ways between fan system (10) and an HVAC control system. For instance, remote control (500) may be used to operate individual HVAC units within a facility that has several HVAC units. In particular, remote control (500) may be used to operate such HVAC units one-by-one, in selected groups simultaneously, all simultaneously, and/or in any other suitable fashion. Alternatively, such a port may be omitted from fan system (10) altogether.

In some variations, a fan system (10) is provided with a handheld remote control (500). Such a handheld remote control (500) may be provided in addition to or in lieu of a wall mounted remote control (500). A handheld remote control (500) may include the same features as a wall mounted remote control (500), may lack some features (e.g., a display screen), or may have additional features that are not present in a wall mounted remote control (500). Of course, other versions of fan system (10) may lack a handheld remote control (500).

Remote Computer

In addition to or as an alternative to a wall mounted unit and/or handheld unit, a remote control (500) may comprise a personal computer or other computer or device. To the extent that a computer or other device is communicatively coupled with fan system (10), such a computer or other device may send any suitable commands or data to a motor control module (90) or other component of fan system (10). For instance, a remote computer may be used to re-configure the display features and button operability of a wall mounted remote control (500) unit.

In addition, a remote computer may receive data (e.g., diagnostics, such as the diagnostic data described above) from a fan system (10), such as for analysis and/or storage. Such data may be sent periodically, upon request by the remote computer, when one or more certain conditions are detected, or under any other circumstances. The data may be used to determine whether maintenance is needed to fan system (10) (e.g., due to general wear and tear on the system, due to a particular fault detected, etc.), or for other purposes.

Similarly, data relating to operation of fan (10) may be collected for detection of misuse of fan (10). For instance, one or more sensors or other components may be used to detect misuse of fan (10). In addition or in the alternative, diagnostic data that is collected as described above may be gleaned for indications of misuse of fan (10). Such misuse of fan (10) may be relevant in the event that a user attempts to obtain a refund or replacement under a warranty. Information indicating misuse of fan (10) may be transmitted to a remote computer. In addition or in the alternative, such information may be stored locally (e.g., in remote control (500)), and acquired via a port or otherwise when servicing fan system (10).

It will also be appreciated that a remote computer may be located in the same room or same facility as fan system (10), or may be located elsewhere (e.g., in another country), particularly if fan system (10) is in communication with a network such as the internet. For instance, fan system (10) may communicate with a cell phone, and/or may communicate via a cell phone modem or use any other suitable means of communication.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A fan system, wherein the fan system comprises:
(a) a hub, wherein the hub is configured to rotate;
(b) a plurality of fan blades mounted to the hub;

(c) a motor, wherein the motor is in communication with the hub, wherein the motor is operable to rotate the hub; and (d) a control panel in communication with the motor, wherein the control panel comprises a display screen and a plurality of user input features, wherein the display screen is operable to display information relating to operation of the fan system, wherein the user input features are operable to control operation of the fan system, wherein the user input features comprise a first user input feature operable to cycle through a plurality of screens rendered on the display screen, wherein each screen of the plurality of screens relates to a different aspect of operation of the fan system;

wherein the control panel is configured to communicate with the motor via wire or wirelessly;

wherein the display screen is configured to display information indicating whether the control panel is in communication with the motor via wire or wirelessly.

2. The fan system of claim 1, wherein the display screen is configured to display a plurality of icons.

3. The fan system of claim 2, wherein the plurality of icons comprise a fan icon, a light icon, and at least one arrow icon.

4. The fan system of claim 3, wherein the display screen is configured to present the fan icon when the hub is rotating, wherein the display screen is configured to not present the fan icon when the hub is not rotating.

5. The fan system of claim 3, further comprising a light, wherein the display screen is configured to present the light icon when the light is activated, wherein the display screen is configured to not present the light icon when the light is not activated.

6. The fan system of claim 3, wherein the display screen is configured to present the at least one arrow icon in accordance with a rotation direction of the hub.

7. The fan system of claim 1, wherein the display screen is configured to display information indicating a rotation speed of the hub.

8. The fan system of claim 7, wherein the information indicating a rotation speed of the hub comprises a percentage representation, wherein the percentage representation represents a percentage of a maximum rotation speed.

9. The fan system of claim 1, wherein the control panel is further operable to control a plurality of fans.

10. The fan system of claim 9, wherein the plurality of screens comprises a fan selection screen, wherein the control panel is operable to select one or more fans of the plurality of fans to be controlled by the control panel when the display screen presents the fan selection screen.

11. The fan system of claim 9, wherein the control panel is operable to control each fan of the plurality of fans individually.

12. The fan system of claim 1, wherein the control panel is operable to change the direction of rotation of the hub.

13. The fan system of claim 12, wherein the plurality of screens comprises a rotation direction selection screen, wherein the control panel is operable to select a direction of rotation of the hub when the display screen presents the rotation direction selection screen.

14. The fan system of claim 1, wherein the control panel is operable to toggle power to an auxiliary device.

15. The fan system of claim 14, wherein the plurality of screens comprises an auxiliary power toggle screen, wherein the control panel is operable to toggle power to the auxiliary device when the display screen presents the auxiliary power toggle screen.

16. The fan system of claim 1, wherein the user input features comprise a keypad having buttons.

17. The fan system of claim 1, wherein the display screen is operable to render a plurality of different images in response to activation of the user input features.

18. The fan system of claim 17, wherein the images are stored as bitmap files.

19. The fan system of claim 17, further comprising a plurality of sensors configured to detect fault conditions within the fan system.

20. The fan system of claim 19, wherein the display screen is configured to display information indicating fault conditions detected by the sensors.

21. The fan system of claim 19, wherein the control panel is rendered at least partially inoperable in response to one or more fault conditions detected by the sensors.

22. The fan system of claim 21, wherein the control panel further comprises a reset feature, wherein the reset feature is configured to restore full operability of the control panel after the control panel has been rendered at least partially inoperable in response to one or more fault conditions detected by the sensors.

23. The fan system of claim 1, wherein the fan system is installed in a facility having an HVAC system, wherein the control panel is further in communication with the HVAC system.

24. The fan system of claim 23, wherein the HVAC system comprises a plurality of HVAC units, wherein the control panel is operable to selectably control one or more of the HVAC units within the HVAC system.

25. The fan system of claim 1, wherein the control panel is mounted to a wall.

26. The fan system of claim 1, wherein the display screen comprises a touch screen, wherein at least a portion of the user input features are provided by the touch screen.

27. The fan system of claim 1, wherein the control panel comprises a remote personal computer.

28. The fan system of claim 1, wherein the control panel comprises a handheld remote control.

29. The fan system of claim 1, wherein the control panel is further in communication with a remote computer system, wherein the control panel is configured to communicate data relating to operation of the fan system to the remote computer system.

* * * * *